United States Patent [19]
Watson

[11] Patent Number: 5,978,780
[45] Date of Patent: Nov. 2, 1999

[54] INTEGRATED BILL CONSOLIDATION, PAYMENT AGGREGATION, AND SETTLEMENT SYSTEM

[75] Inventor: Craig Michael Watson, 175 N. Harbor Dr., Chicago, Ill. 60601

[73] Assignee: Craig Michael Watson, Chicago, Ill.

[21] Appl. No.: 08/976,204

[22] Filed: Nov. 21, 1997

[51] Int. Cl.$^6$ .................................................. G06F 17/60
[52] U.S. Cl. ........................ 705/40; 705/38; 705/39; 705/44
[58] Field of Search .................. 705/40, 38, 39, 705/42, 44, 37, 34

[56] References Cited

U.S. PATENT DOCUMENTS

| | | | |
|---|---|---|---|
| 4,633,397 | 12/1986 | Macco | 364/406 |
| 4,933,842 | 6/1990 | Durbin et al. | 364/408 |
| 4,953,085 | 8/1990 | Atkins | 364/408 |
| 4,988,849 | 1/1991 | Sasaki et al. | 235/379 |
| 5,126,936 | 6/1992 | Champion et al. | 364/408 |
| 5,210,687 | 5/1993 | Wolfberg et al. | 364/408 |
| 5,214,579 | 5/1993 | Wolfberg et al. | 364/408 |
| 5,220,500 | 6/1993 | Baird et al. | 364/408 |
| 5,220,501 | 6/1993 | Lawlor et al. | 364/408 |
| 5,231,571 | 7/1993 | D'Agostino | 364/408 |
| 5,252,811 | 10/1993 | Henochowicz et al. | 235/379 |
| 5,283,829 | 2/1994 | Anderson | 380/24 |
| 5,326,959 | 7/1994 | Perazza | 235/379 |
| 5,347,632 | 9/1994 | Filepp et al. | 395/200 |
| 5,383,113 | 1/1995 | Kight et al. | 705/40 |
| 5,465,206 | 11/1995 | Hilt et al. | 364/406 |
| 5,483,445 | 1/1996 | Pickering | 364/406 |
| 5,496,991 | 3/1996 | Delfer, III et al. | 235/379 |
| 5,570,283 | 10/1996 | Pickering | 705/40 |
| 5,583,759 | 12/1996 | Geer | 395/245 |
| 5,655,089 | 8/1997 | Shoolery et al. | 705/5 |
| 5,684,965 | 11/1997 | Pickering | 705/34 |
| 5,696,907 | 12/1997 | Tom | 705/38 |
| 5,832,460 | 11/1998 | Bednar et al. | 705/27 |

OTHER PUBLICATIONS

Stewart Deck, "CyberCash, BlueGill partner to offer online bill payment technologies," Online News Story, Sep. 5, 1997 (1 page) Sep. 5, 1997.

"AT&T pulls CIO off of billing project," cw.com (2 pages) May 12, 1997.

"New System for Web bill payments," news.com (3 pages) Sep. 14, 1997.

"CyberCash Interactive Billing and Payment," cybercash.com (2 pages) Sep. 14, 1997.

"Why Cybercash Biller Direct is the Best Solution for Electronic Billing," cybercash.com (8 pages) Sep. 14, 1997.

"Cybercash Set Complete Payment Solution," cybercash.com (3 pages) Sep. 14, 1997.

"E–Commerce: AT&T and Mondex announce electronic cash for the Internet," elibrary.com (3 pages) Sep. 14, 1997.

(List continued on next page.)

Primary Examiner—Edward R. Cosimano
Assistant Examiner—Thomas A Dixon
Attorney, Agent, or Firm—Paul E. Schaafsma; Manisha C. Wulf

[57] ABSTRACT

The present invention is an integrated bill consolidation, payment aggregation, and account-payment application system. The system acts as a settlements exchange for the execution of payments between households or small businesses and the service establishments (principally utilities, financial institutions, telecoms, and others) that serve them. The system eliminates paper check payments without requiring automation at the household level (for example, telephone bill-pay, PC payment systems). The invention provides for the consolidated billing of a plurality of services to a plurality of households, the payment to individual service establishments in aggregate "bullet" transfers (verses individual household payments), and the automated application of payments to service establishment accounts. The present system computes, stores, and communicates the information needed to direct the financial institution processing of debit and credit transactions between thousands of service establishments providing goods and services and millions of consuming households. The system provides for a number of methods of payment, adjusts for partial and delayed payments, and automatically structures and schedules payments in arrears.

33 Claims, 18 Drawing Sheets

Personal Settlements Exchange Flow Overview

OTHER PUBLICATIONS

"Manning Selvage & Lee: Electronic banking could save UK industry millions," elibrary.com (3 pages) Sep. 14, 1997.

"Personal Technology: New–Fashioned banking: It's not for everyone: Unless you're patient or live to be on the cutting: edge, an online checkbook can turn into a chore," elibrary.com (2 pages) Sep. 14, 1997.

Price Waterhouse: Price Waterhouse and CyberCash form agreement to provide Internet currency solutions, elibrary.com (4 pages) Sep. 14, 1997.

"PC Focus/Lawrence J. Magid; Personal Technology; Checks and Balances Made Easy; Home Edition," elibrary.com (2 pages) Sep. 14, 1997.

"Microsoft: Microsoft & First Data form new company to enable consumers to receive & pay bills over net," elibrary.com (5 pages) Sep. 14, 1997.

"IBM Says It Can Make Internet Payments Safe Cyberscape," elibrary.com (2 pages) Sep. 14, 1997.

"Electronic Currency: A cash cow," elibrary.com (2 pages) Sep. 14, 1997.

"Deluxe Data: Deluxe Data launches new generation of Microsoft Windows NT–based Internet banking products," elibrary.com (3 pages) Sep. 14, 1997.

"Visa, Mastercard Publish EFT Protocol Standard," elibrary.com (2 pages) Sep. 14, 1997.

"Nation/World; Utilities; Venture Will Offer On–Stop Shopping; Home Edition," elibrary.com (1 page) June 25, 1997.

"CEO of EnergyOne Discusses Recent Merger of Utilicorp and Peco," elibrary.com (3 pages) Sep. 14, 1997.

"BlueGill Products and Services," bluegill.com (1 page) Sep. 14, 1997.

"BlueGill—1 to 1 Server," bluegill.com (1 page) Sep. 14, 1997.

"BlueGill—Industry Solutions," bluegill.com (1 page) Sep. 14, 1997.

"Money & Technology Strategies," forrester.com (15 pages) Sep. 14, 1997.

"Open Financial Exchange to Support Bill Presentment," microsoft.com (3 pages) Jun. 16, 1997.

"Open Financial Exchange Bill Presentment," pp. 312–350, Jun. 12, 1997 Jun. 1997.

"American Express Launches New Business, American Express Financial Direct, To Provide Financial Products Directly to Consumers," American Express News Release (4 pages) May 15, 1996.

"Electronic Payment Systems," Computer Science/Mathematics (16 pages) Sep. 3, 1996.

Flohr, "Electronic Money," Byte Jun. 1996 (pp. 74–84) Jun. 1996.

"The Competition Heats Up in Online Banking," Fortune, Jun. 26, 1995 (pp. 10–11) Jun. 26, 1995.

"Internet Business Solutions," Open Market, Inc., (2 pages) Sep. 1996.

"Fuji Bank Offers Internet Debit Software," Asian–Paci (1 page) Jun. 3, 1997.

"Billing '97," Asian Pacific (8 pages) Apr. 21, 1997.

"UtiliCorp and Peco Launch One–Stop Utility Service," The Asian Wall Street Journal, Jun. 25, 1997 (1 page) Jun. 25, 1997.

"Intuit Will Pay $40 Million for 19% Stake in Excite" (1 page) Jun. 13, 1997.

"Electronic Bill Presentment and Payment (EBPP)," msfdc.com (4 pages) Jul. 1, 1997.

"Microsoft and First Data Form New Company to Enable Consumers to Receive and Pay Bills Over the Internet," prnewswire.com (3 pages) Jun. 27, 1997.

"Universal Electronic Payment System (U.E.P.S)," bgs.ru (2 pages) Sep. 14, 1997.

"U.E.P.S. Universal Electronic Payment System," bgs.ru (7 pages) Sep. 14, 1997.

"Web900 billing service," ibill.com (3 pages) Sep. 14, 1997.

"Online Payment System Q&A," webcs.com (2 pages) Sep. 14, 1997.

"Hyperion Electronic Payment System," virtualschool.edu (4 pages) Aug. 15, 1994.

"Development of an Open and Flexible Payment system," systemics.com (13 pages) Aug. 1996.

"Intermediation and Payment System Technical Overview," gctech.fr (2 pages) Sep. 14, 1997.

"FaxACheck & Trade," instachecks.com (3 pages) Sep. 14, 1997.

"TynLink Home Banking . . . Managing Your Money in the Fast Lane," tyndallfcu.org (1 page) Sep. 14, 1997.

"Payment System Overview," rhodes.edu (1 page) Sep. 14, 1997.

"Direct Debit Payment System," clever.net (2 pages) Sep. 14, 1997.

"Become a Team Infinity member!," teaminfinity.com (4 pages) Sep. 14, 1997.

"Revolutionizing The Way Money Moves," checkfree.com (1 page) Sep. 2, 1997.

"Banking," checkfree.com (1 page) Sep. 14, 1997.

"Bill Presentment," checkfree.com (1 page) Sep. 14, 1997.

"Bill Payment," checkfree.com (1 page) Sep. 14, 1997.

"The Future of Electronic Commerce," checkfree.com (1 page) Sep. 14, 1997.

"Industry Trends," checkfree.com (1 page) Sep. 14, 1997.

"CheckFree and Consumers Energy Bring Electronic Bill Presentment to Michigan Residents,"checkfree.com (2 pages) Jun. 17, 1997.

"CheckFree Corporation to Help Charles Schwab Customers Pay Bills on the Internet," checkfree.com (2 pages) Jun. 4, 1997.

"CheckFree Releases First Fully–Operational, Single–Site Electronic Bill Delivery and Payment Product," checkfree.com (4 pages) Mar. 4, 1997.

"CheckFree Announces Agreement With Fundtech to Market and Implement Multi–Bank Wire Transfer System," checkfree.com (2 pages) Mar. 25, 1997.

"CheckFree Corporation Completes Acquisition of Intuit's Transaction Processing Unit," checkfree.com (2 pages) Jan. 27, 1997.

"About Edify," edify.com (2 pages) Sep. 14, 1997.

"Industry Background," edify.com (1 page) Sep. 14, 1997.

"Milestones," edify.com (10 pages) Feb. 10, 1997.

"ACI and Edify Partner to Deliver Internet Banking," edify.com (2 pages) Sep. 23, 1996.

"Edify Corporation to Support Ituit's New Open Exchange Framework," edify.com (2 pages) Sep. 16, 1996.

"Don't forget! Register for Edification '97 now!," edify.com (1 page) Sep. 14, 1997.

"SFNB," sfnb.com (1 page) Sep. 14, 1997.

"SFNB—Atlanta Welcome," sfnb.com (2 pages) Sep. 14, 1997.

"Microsoft Financial Services—Press Release," microsoft.com (5 pages) Sep. 14, 1997.

"Integrion Buys Visa Interactive," cw.com (1 page) Aug. 26, 1997.

"Banks cash in on Web," cw.com (4 pages) Apr. 28, 1997.
"First Virtual Holdings, IBM integrate 'net commerce systems," cs.com (1 page) May 9, 1997.
"The First Virtual Solution," fv.com (1 page) Sep. 14, 1997.
"Buying Summary," fv.com (1 page) Sep. 14, 1997.
"Oracle Electronic Commerce," cw.com (1 page) no date.

FIG. 1   Personal Settlements Exchange Flow Overview

FIG. 2  Personal Settlements Exchange Core Computer-Implemented Processes

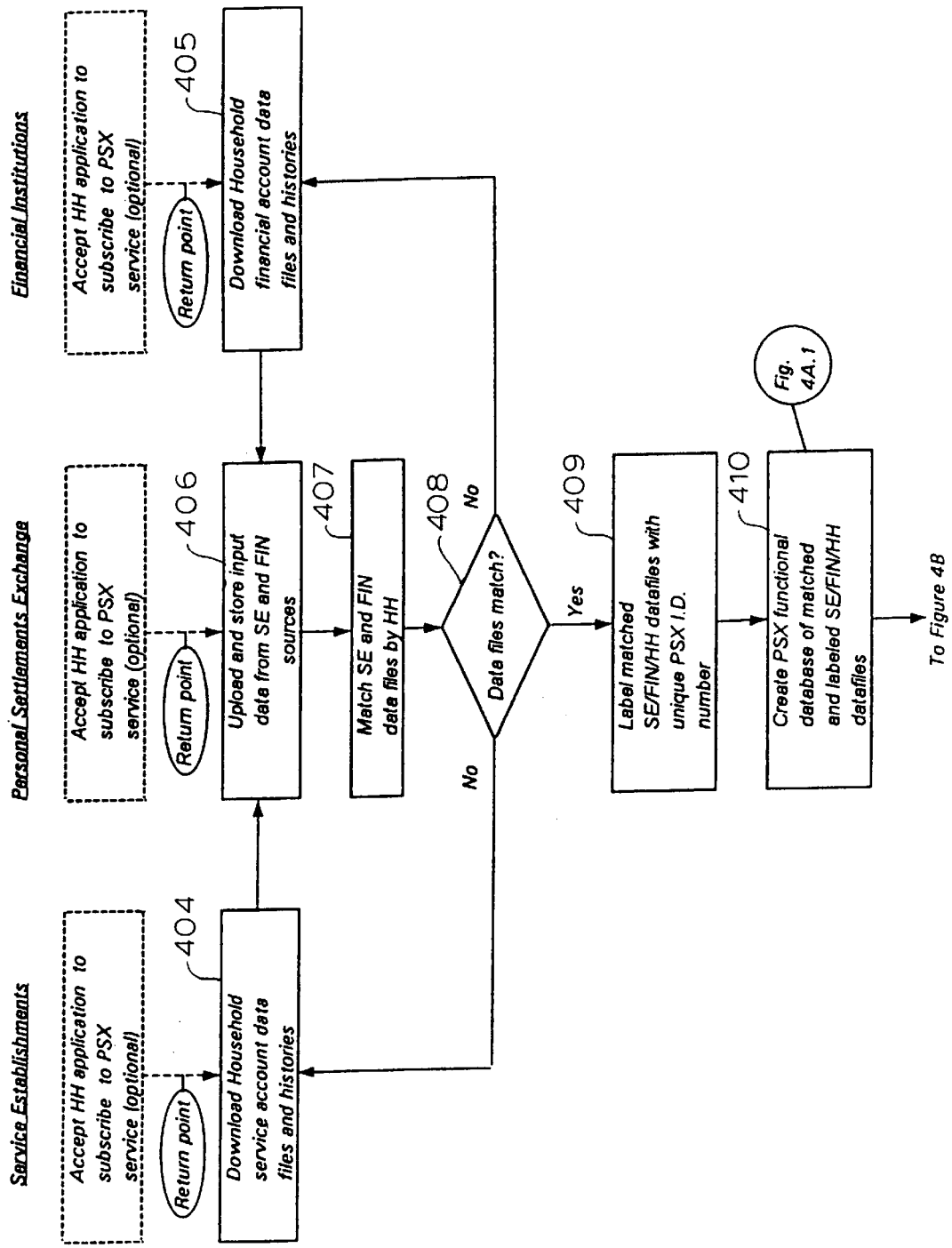

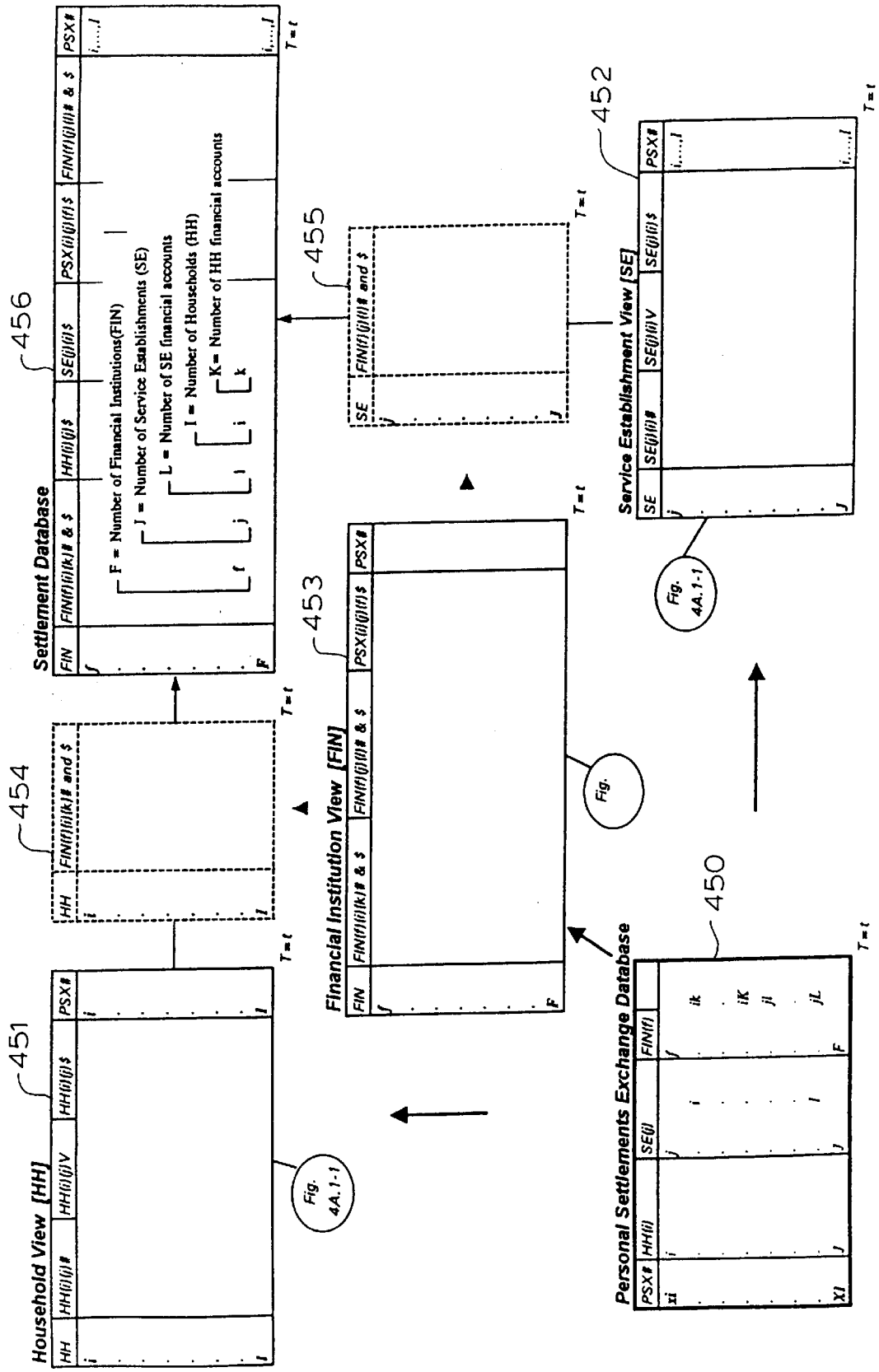

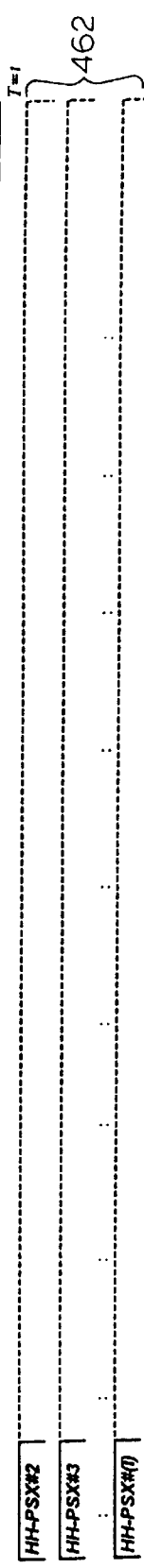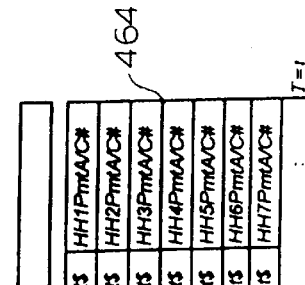
FIG. 4A.1-1  Illustrative Database Models: HH View, SE View

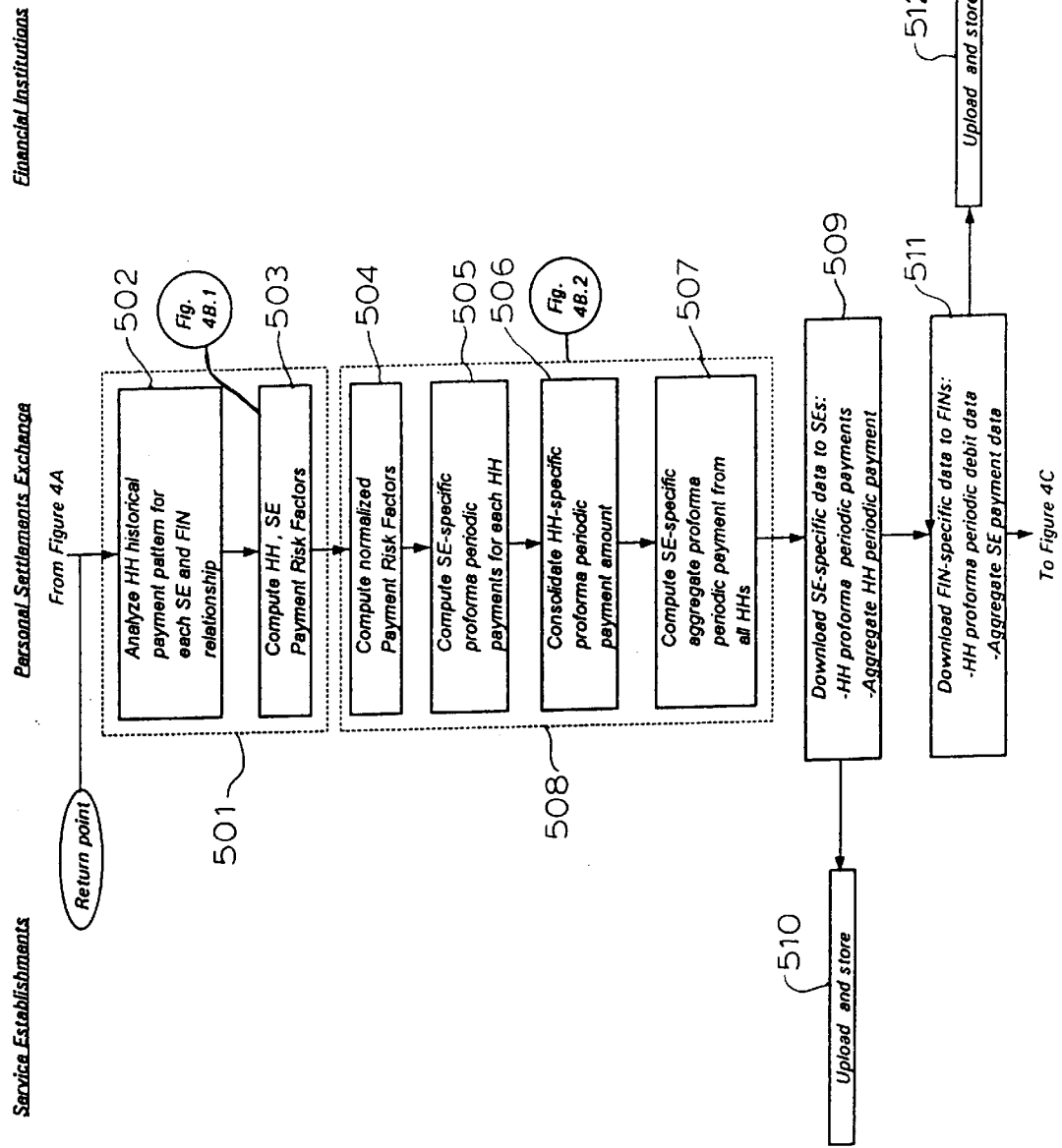
FIG. 4B  Analysis of Risk and Computation of Proforma Payments

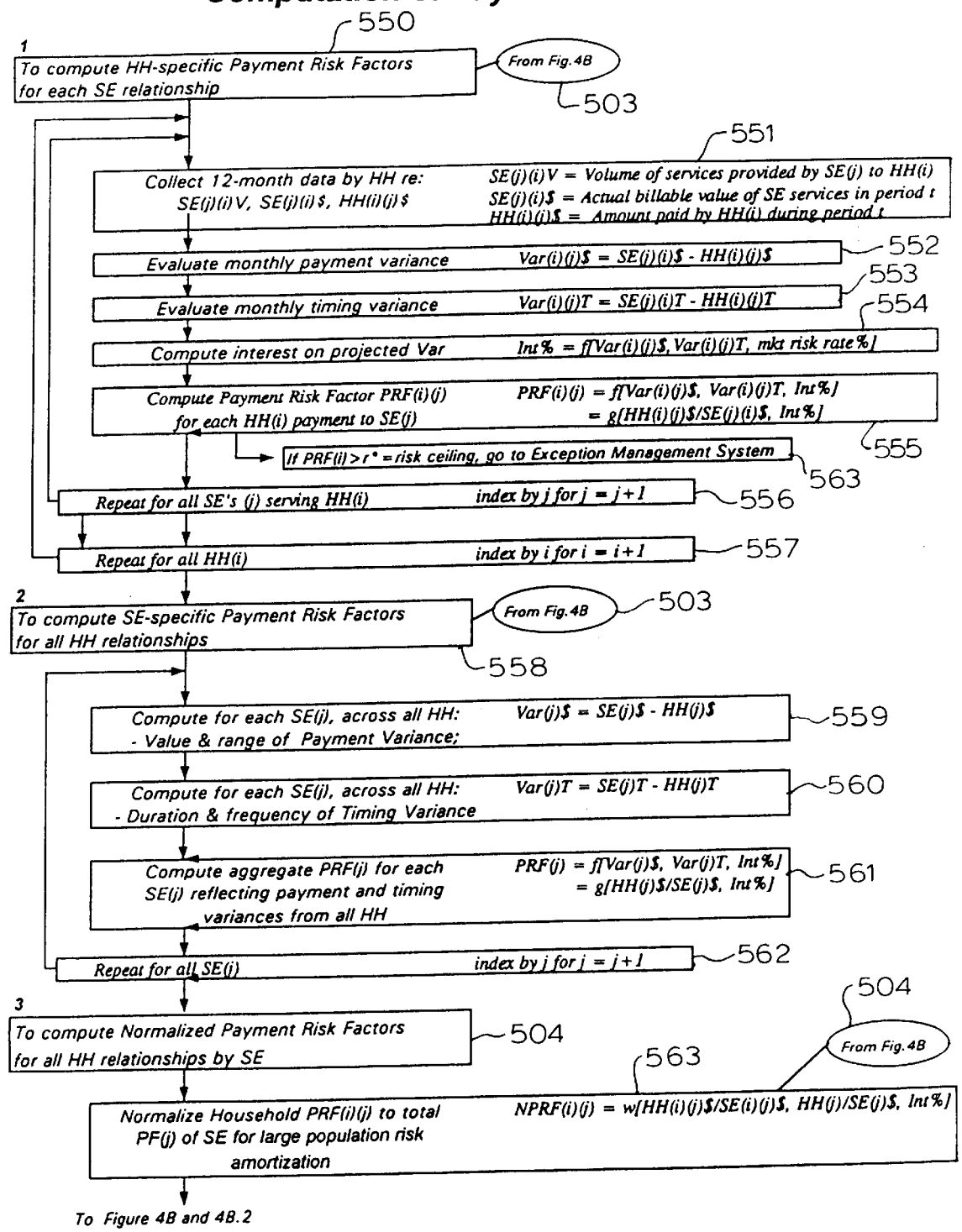

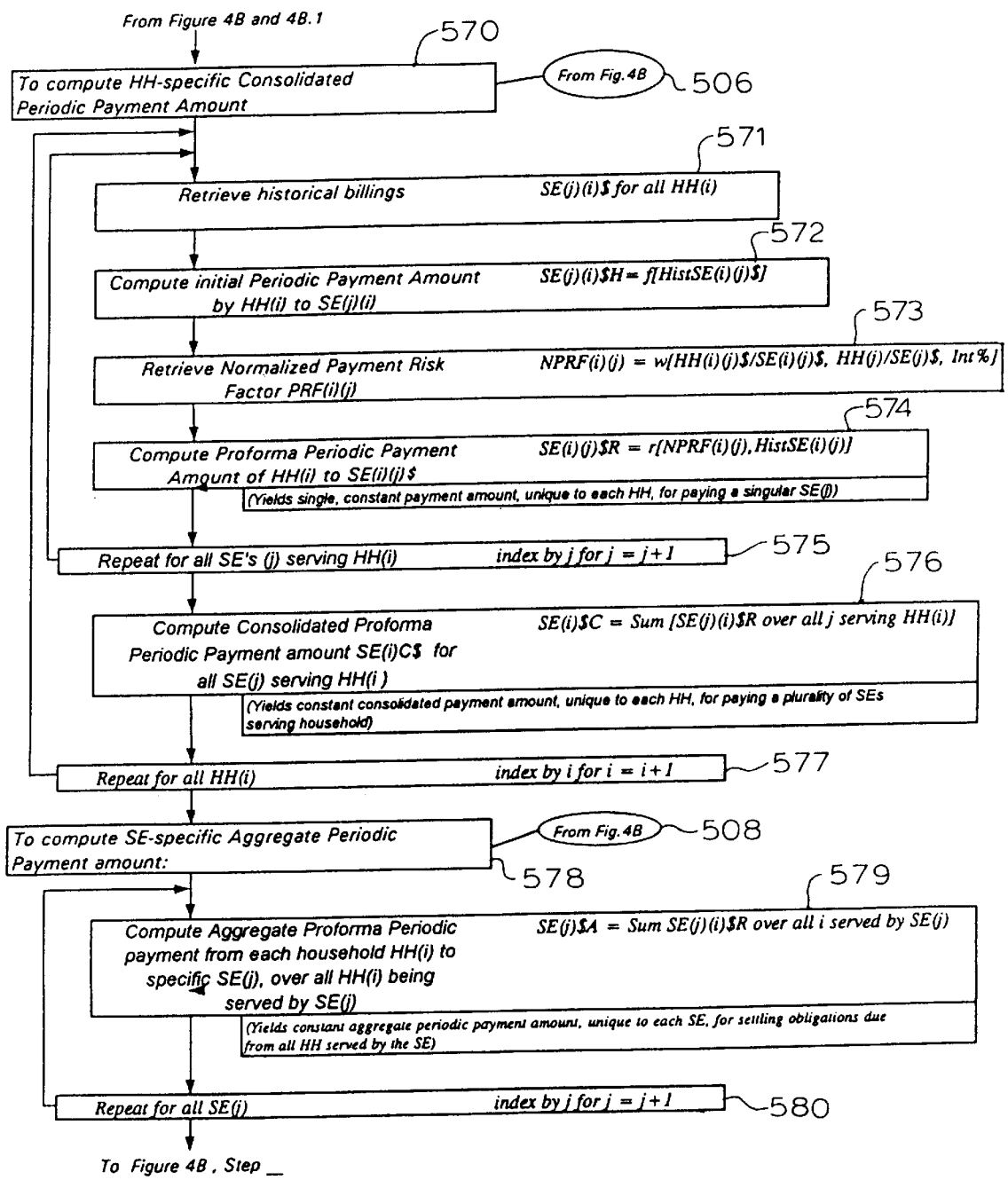
FIG. 4B.2
Computation of Performa Household Payments to Service Establishments

FIG. 4C.1
Processing of SE Service and Billing Data
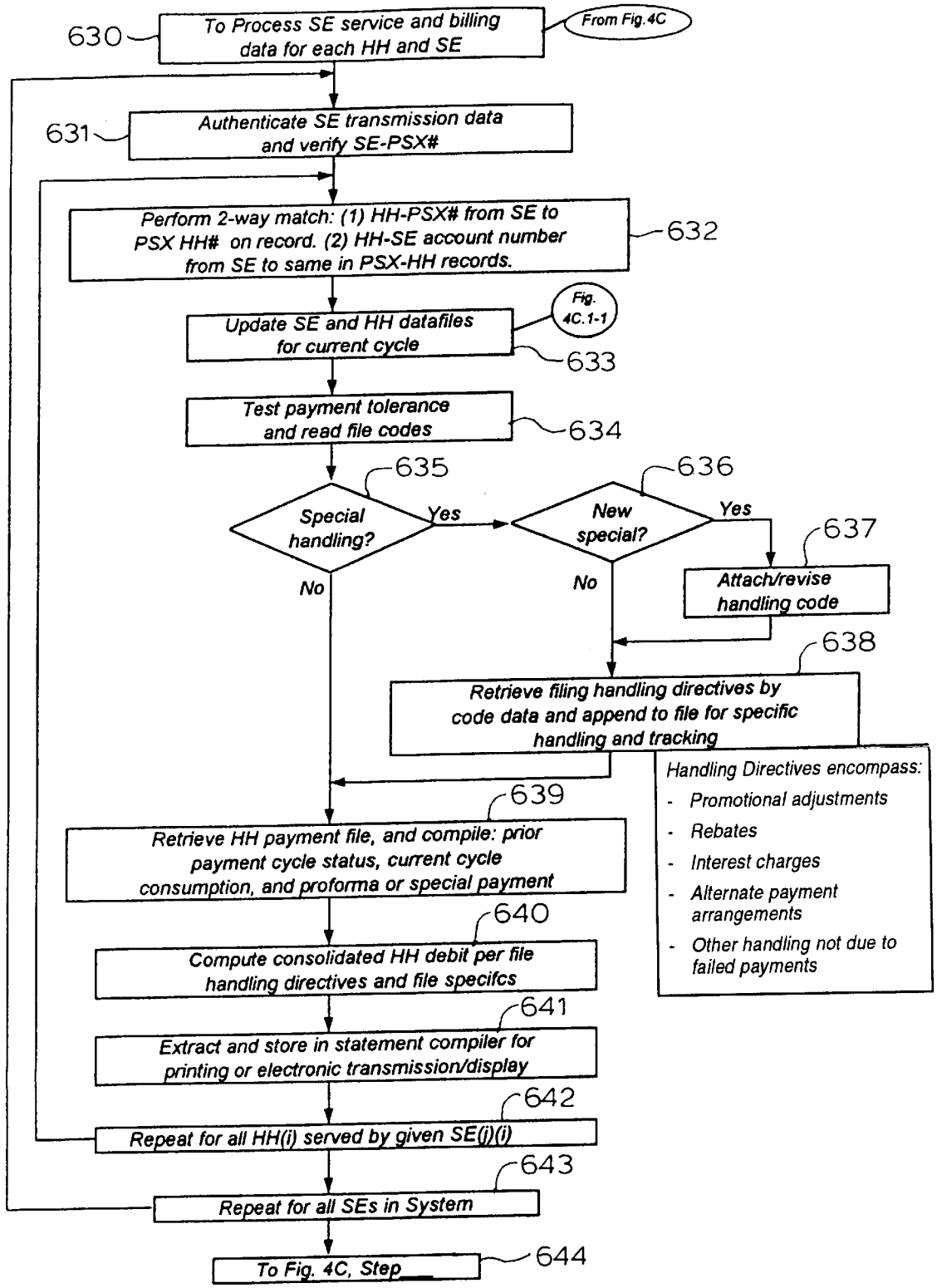

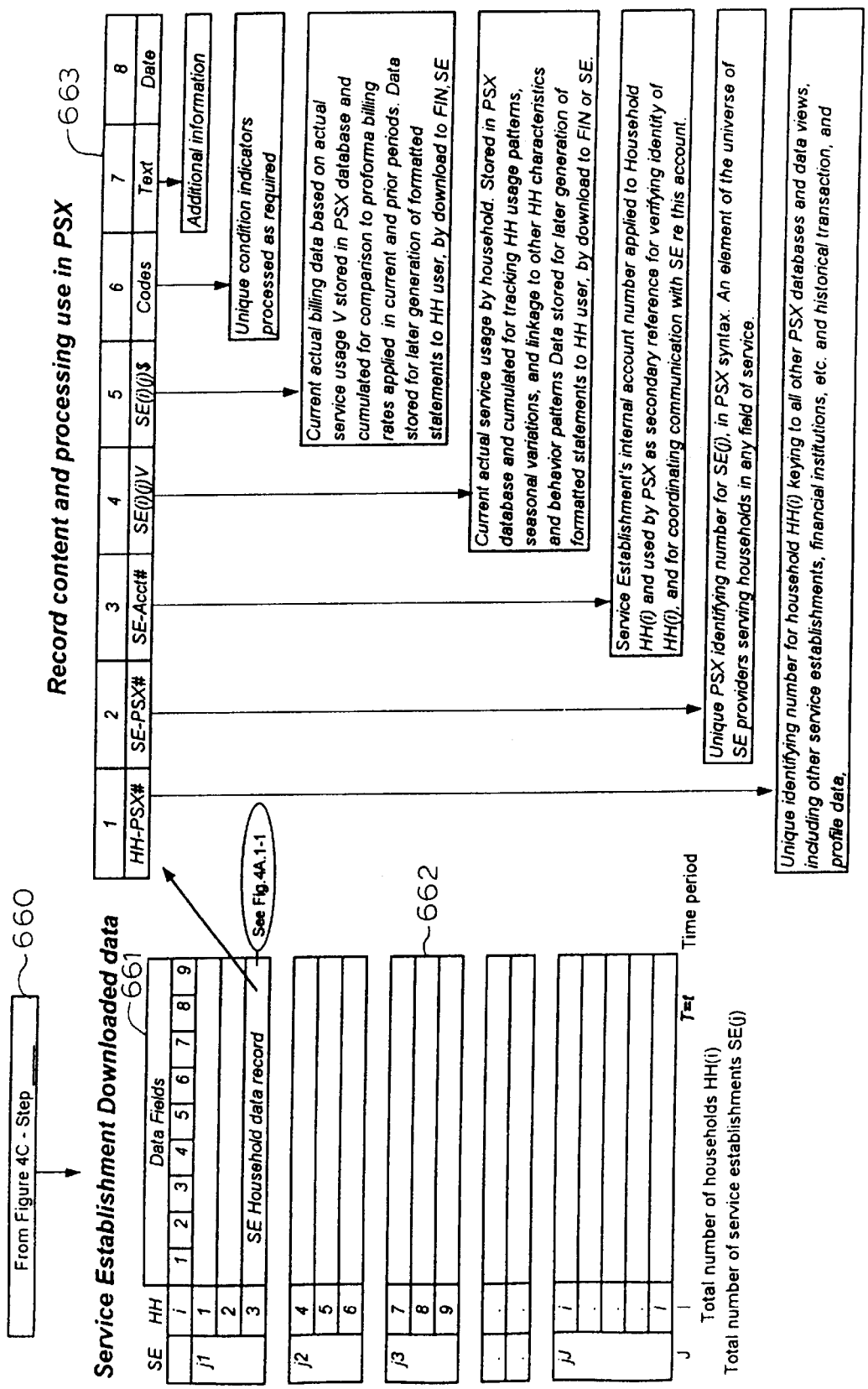
FIG. 4C.1-1 Service Establishment Data Table Processing
[SE Service and Billing Processing Detail]

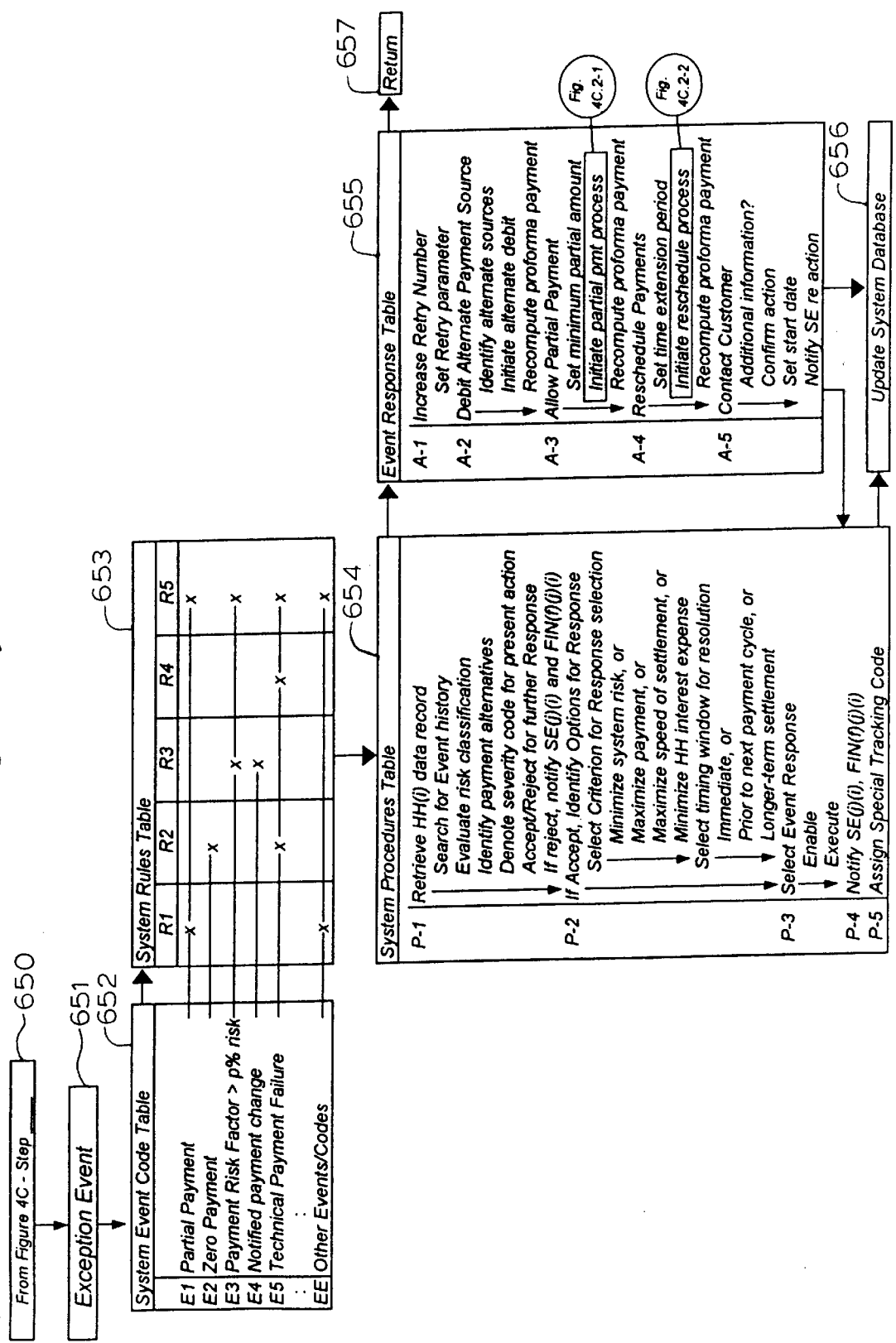

FIG. 4C.2-1
*Partial Payment Processing Method [Exception Management System Detail]*
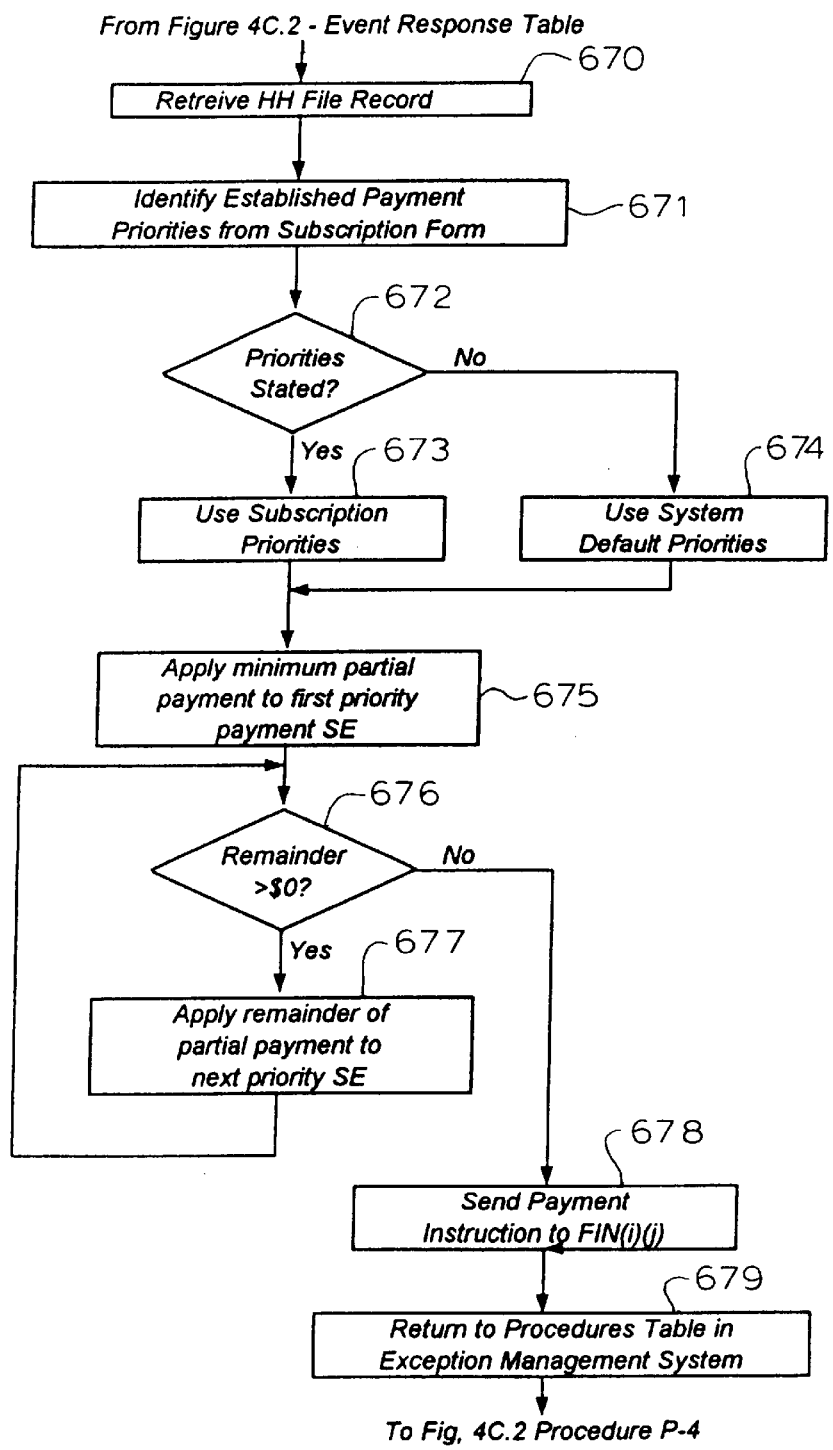

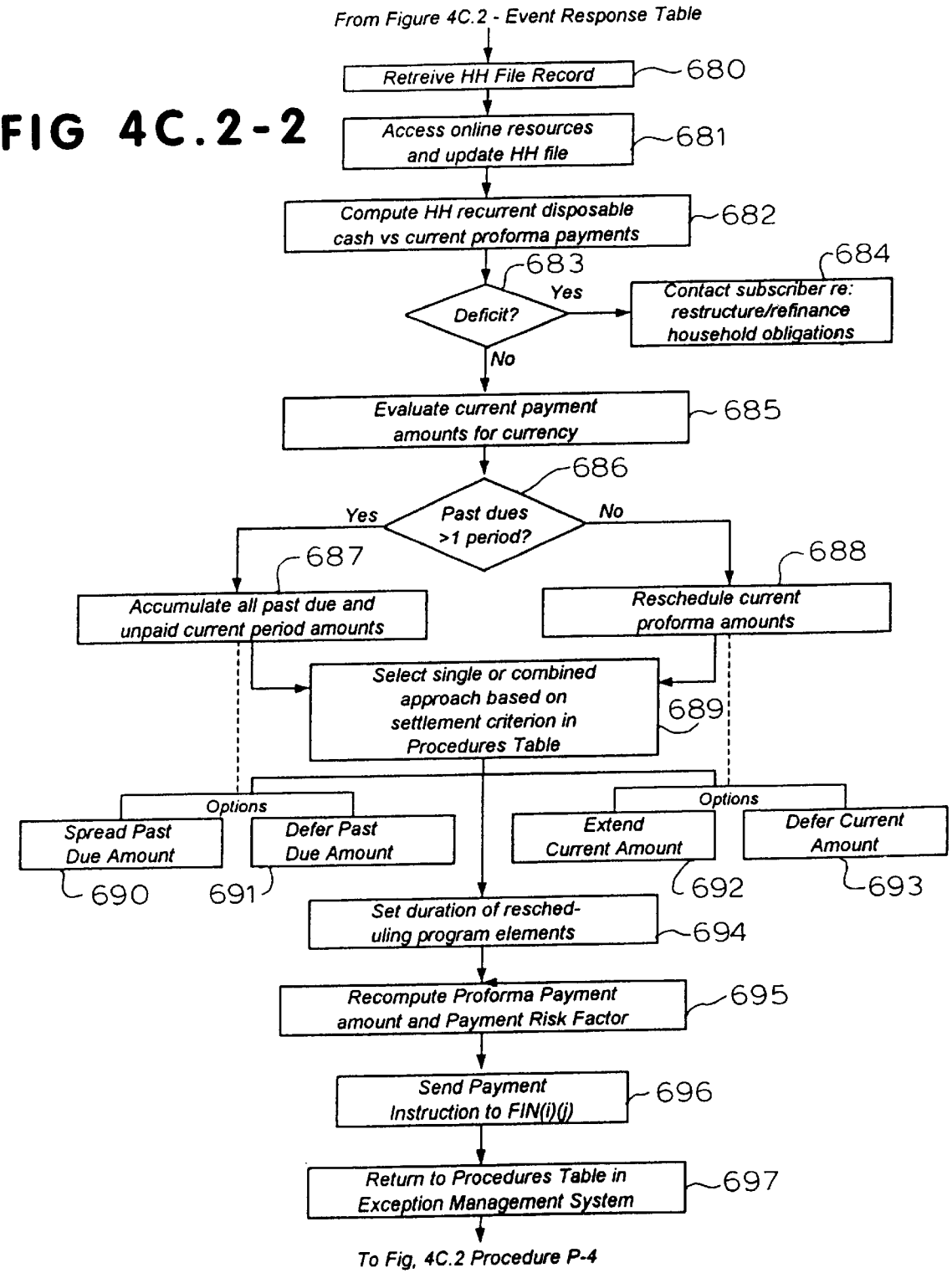

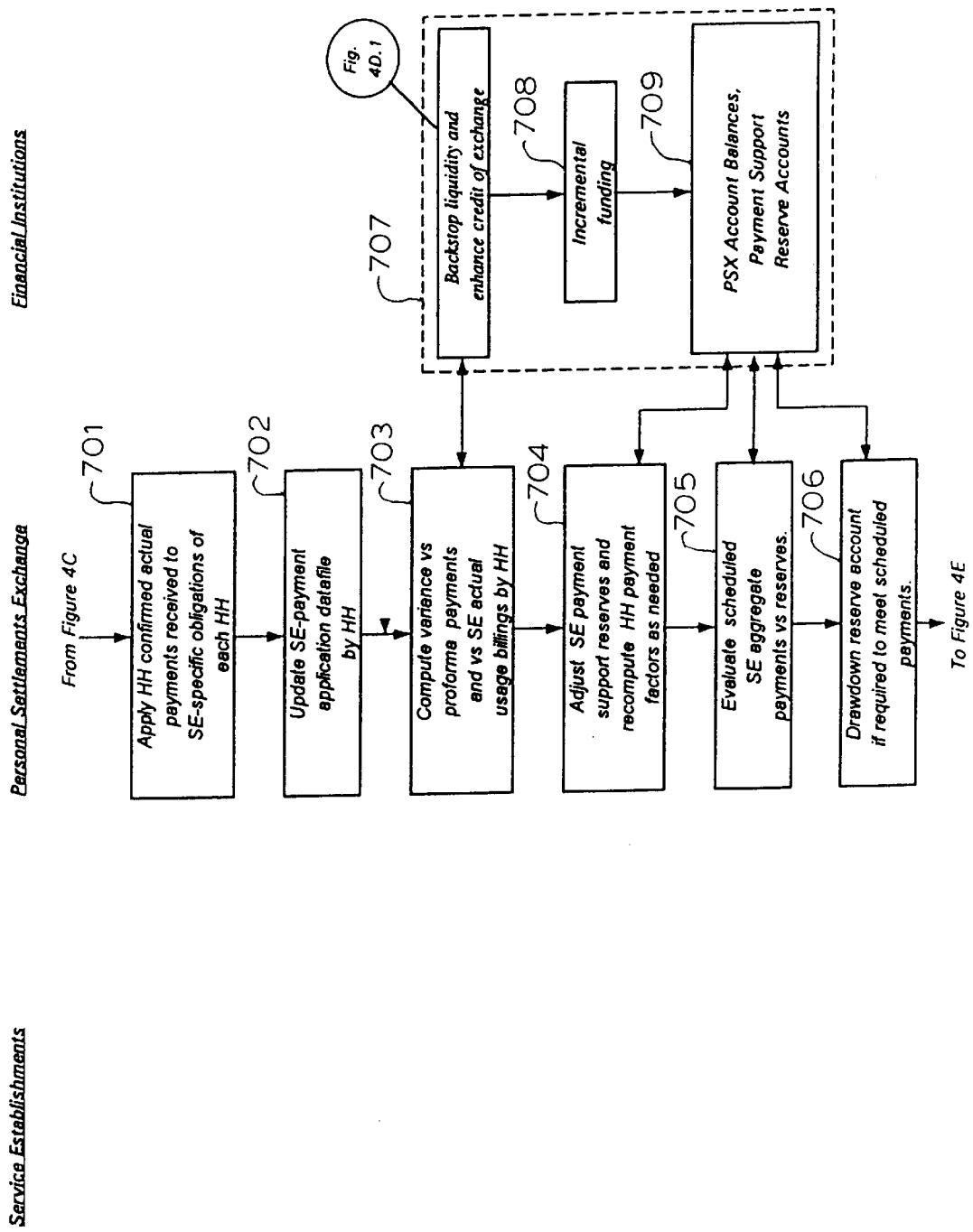
FIG. 4D  Payment Reserve Analysis and System Credit Enhancement

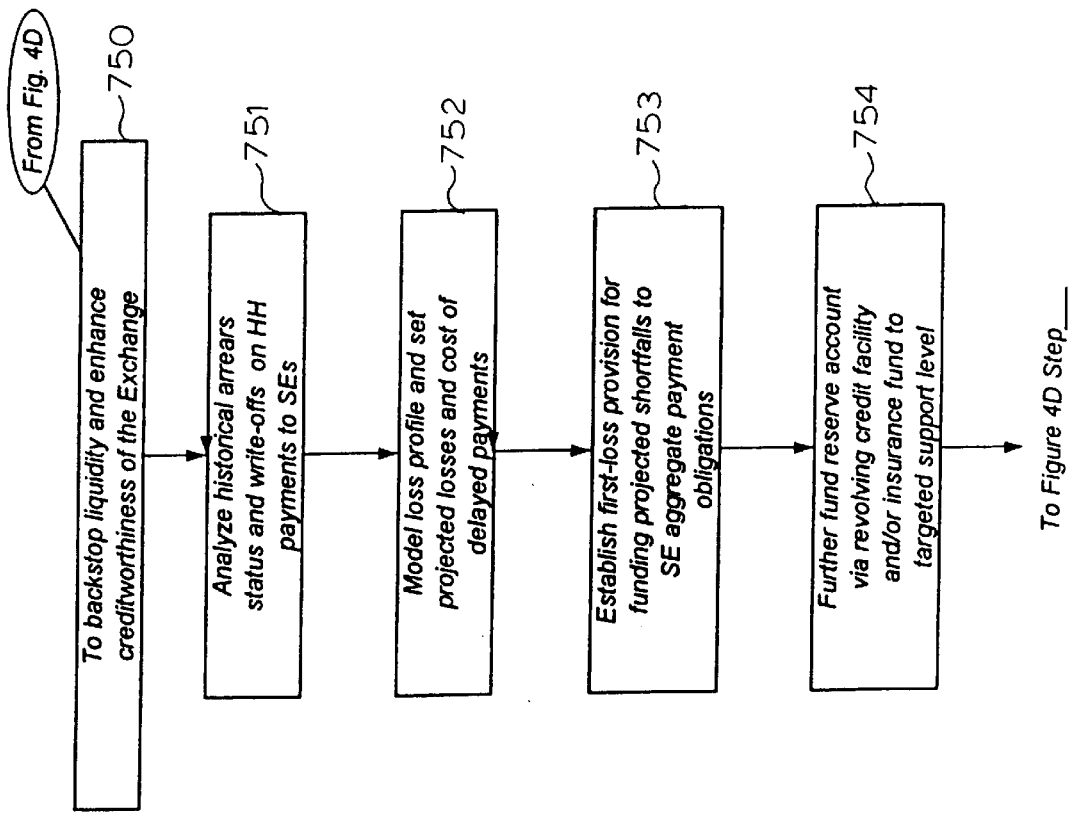
FIG. 4D.1  Liquidity Support and Credit Enhancement Detail

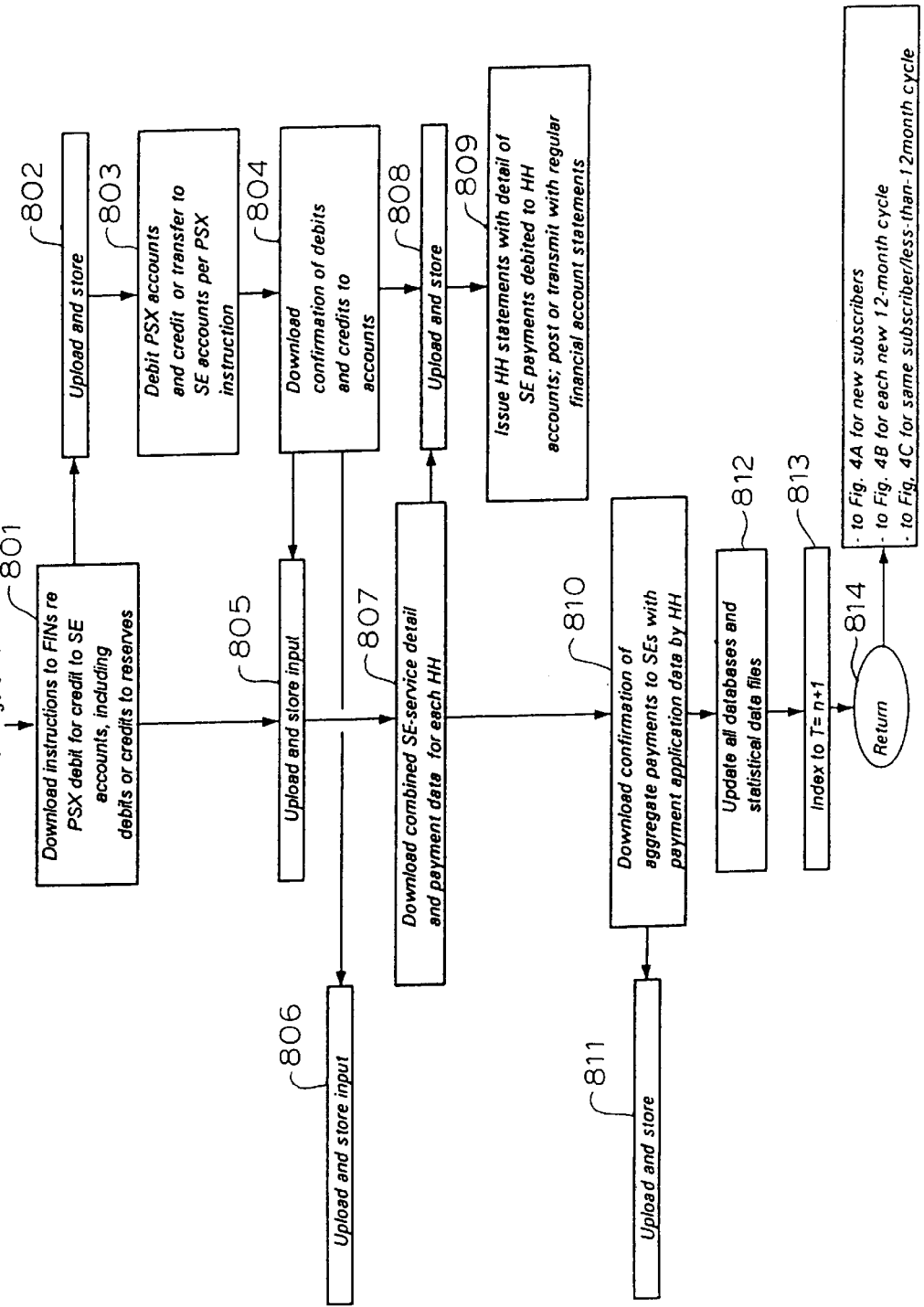

INTEGRATED BILL CONSOLIDATION, PAYMENT AGGREGATION, AND SETTLEMENT SYSTEM

BACKGROUND OF THE INVENTION

Conventional household bill payment is based on the receipt by mail of a paper statement from each service establishment for each billing period.

Households issue a multitude of paper checks and associated paper return stubs to these service establishments and the payments are cleared through banks, credited to service establishment bank accounts, and applied or credited to the household accounts on record. In this conventional system, for example, a city of 3 million households, each writing only 5 checks each month will generate more than 60 million paper transactions per month, or 720 million in a year.

Conventional payment systems are designed to handle these inefficient paper payments on a large scale, causing more efficient alternatives to actually increase costs, because they require special "exception" handling. Nevertheless, there has been substantial focus on electronic alternatives to paper checks and stubs. Typically, these electronic alternatives involve automating the consumer interface to enable the creation of electronic transactions, such as, for example, telephone bill-paying, service bureaus, automatic teller machine payment, internet-based home banking, and electronic bill presentment and payment. However, households do not easily adopt new payment systems on a large scale, and receiving service establishments generally resist the associated exception costs. While Internet-based electronic bill presentment and payment may eventually come into widespread use, to date, commercially viable alternate payment technologies have had a negligible impact on reducing the inefficiencies inherent in conventional paper-based bill payment.

Thus, what is needed is an automated household bill payment system that eliminates paper-based bill payment. The system should be easily adaptable to household use on a large scale. The system further should be low cost to service establishments. The system further should not require electronics or automation at the household point of payment. The system should readily accommodate and directly facilitate the eventual transition to full electronic bill presentment and payment over electronic networks.

SUMMARY OF THE INVENTION

The present invention provides an automated household bill payment system that eliminates 95% of the paper transactions generated in conventional bill-pay processes. The present invention is easily adaptable to household use on a large scale. The present invention further is low cost to service establishments. The present invention achieves these objects without requiring electronics or automation at the household point of payment. The present invention readily accommodates and greatly facilitates the transition to full electronic bill presentment and payment over electronic networks such as the Internet.

A computer-implemented information processing system that acts as a personal settlements exchange for the payment of household bills is provided. The personal settlements exchange encompasses collection and consolidation of household bills into a single periodic statement, aggregation of payments to service establishments, and application of payments to service establishment individual household accounts, all by way of a database management, information processing, and communications system. Banks and service establishments enlist their customer accounts in the personal settlements exchange. Importantly, startup participation need not be at the initiative of the household; enrollment of household accounts is a decision of service establishments and banks.

In a given payment cycle:

(i) Service establishments provide the personal settlements exchange with actual service and billing detail by electronic transmission;

(ii) The personal settlements exchange calculates a consolidated payment or obligation value across all service establishments serving each household. Households agree in advance to pay on a selected date or dates the consolidated amount or an agreed portion thereof;

(iii) The consolidated payment value, service establishment billing data, and billing statement content and format detail for each household are then electronically downloaded from the personal settlements exchange to each household's selected bank;

(iv) These banks use the data file to generate a single printed or electronic consolidated household billing statement, which is transmitted to each household by mail (and eventually by electronic means) in lieu of individual statements being compiled, printed, and mailed by each service establishment;

(v) After the statements have been received by the households, and an agreed amount of time has passed, the personal settlements exchange instructs the banks to electronically debit from or charge to the household bank accounts involved, the consolidated household obligation value or payment amount;

(vi) The personal settlements exchange then aggregates all of the household payment amounts that are destined for the same service establishment into a single amount and repeats this aggregation for all service establishments. The result is a calculation of the total cash value to be transferred from all households to each individual service establishment, in the form of aggregate bullet payments. The personal settlements exchange instructs the banks to issue these credits to service establishment bank accounts, resulting in the banking system's payment of all household payment obligations for the period. This approach to payment uses only a fraction of the transactions entailed in household-by-household payments to service establishments, and eliminates paper checks from the payment process;

(vii) Following confirmation of payment execution, the personal settlements exchange issues to each service establishment a detailed verification of the amount and timing of each household's payment. This step provides the information needed to allocate the aggregate value received by each service establishment to individual households, thus enabling correct application of payment to the appropriate household account number with the service establishment.

The inventive process results in several benefits:

Of the illustrative 60 million transactions per month noted earlier, only 5% or 3 million (the issuance of the consolidated statements) remain under the present system; there are no longer any checks to be written, processed or deposited, and no individual statements from each service establishment to be issued.

The centralized collection of household service establishment information by the personal settlements exchange enables multiple household service establishment billings to be compiled into and presented as a single statement, without the need for direct participation or conscious choice on the part of households. Consequently, consolidated statements can be generated and presented to millions of households without waiting for them to subscribe individually to the service.

Alternate payment methods, whether electronic, debit, charge, or credit can be utilized by choice or offered by default in the present invention, thus creating flexibility for households, utility for service establishments, and functionality for banks.

Since the present invention results in a small number of high-value payments from banks to service establishments, the reliability, simplicity, and cost of actual payment issuance and receipt is dramatically improved.

Because the entire billing and payment-application cycle is managed in the personal settlements exchange system, rather than in the service establishments, these payments do not create exception costs for service establishments.

DRAWINGS OF THE PREFERRED EMBODIMENT

FIG. 4A–E is a flow diagram that shows the functioning and methodology in accordance with the principles of the present invention.

FIG. 4A.1 shows further detail of FIG. 4A, and represents a conceptual database model of the present invention showing the relationships among consuming households database, service establishments database, and banks database in the overall context of the personal settlements exchange.

FIG. 4A.1–1 shows further detail of FIG. 4A.1, and highlights the database model structure and views for the consuming households database and the service establishments database to provide a general concept of the data structures underlying the system of the present invention.

FIG. 4B.1 shows further detail of FIG. 4B and is a flow diagram showing the detailed computation of the payment risk factors of the present invention.

FIG. 4B.2 shows further detail of FIG. 4B and is a flow diagram of the actual computation of proforma payments from consuming households to service establishments.

Figure 4C:
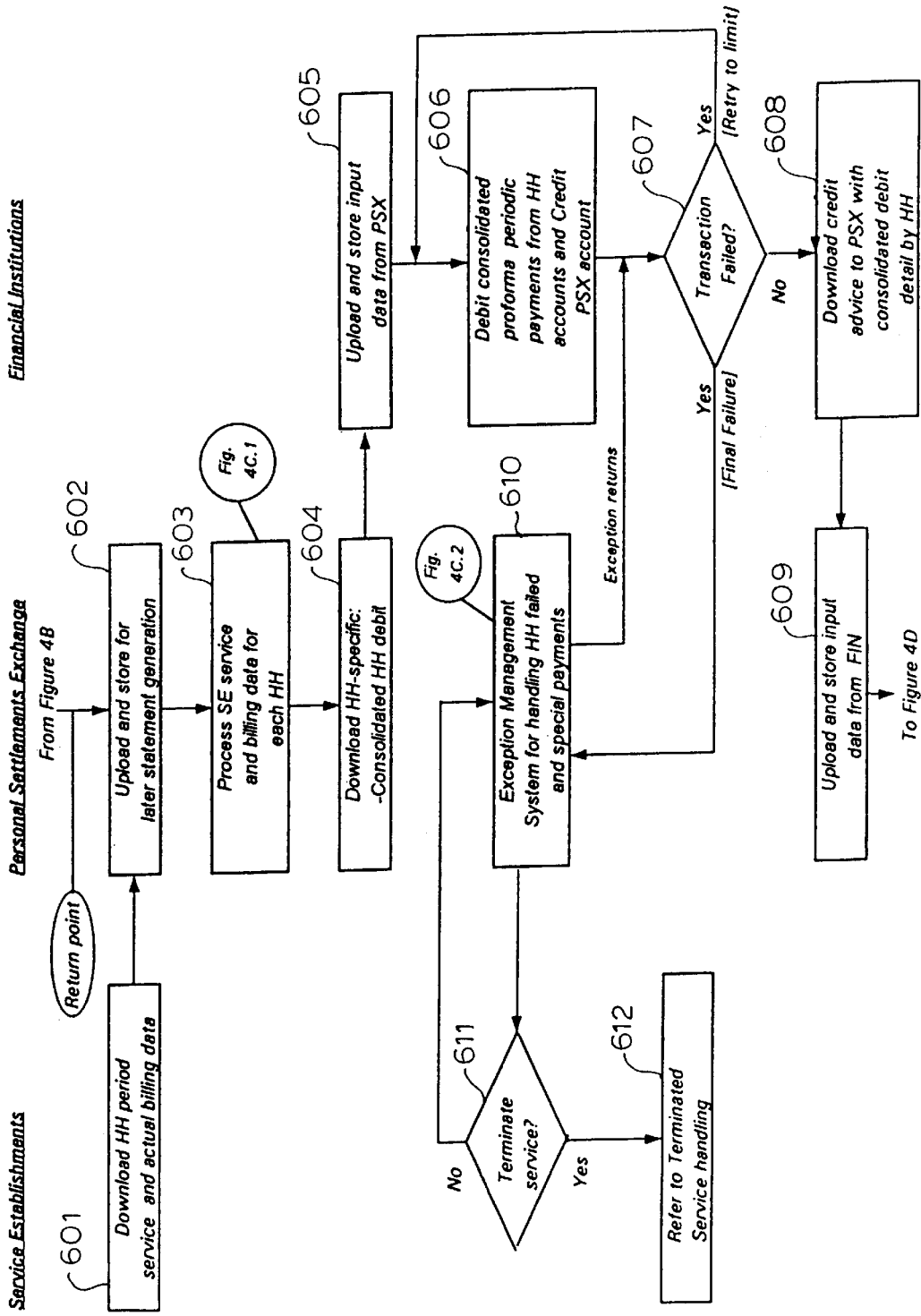

FIG. 4C. 1 shows further detail of FIG. 4C and is a flow diagram of the processing of service establishments service and billing data received from each service establishment for the current payment cycle.

FIG. 4C.1–1 shows further detail of FIG. 4C.1 and is a representation of the structure of the service establishments data records as downloaded to the personal settlements exchange system from the service establishments, and the content of a single such data record in the service establishment data table.

FIG. 4C.2 shows further detail of FIG. 4C and is a box diagram showing the relationships and tables of rules and codes in the exception management program of the present invention.

FIG. 4C.2–1 provides further detail of FIG. 4C.2 and is a flow diagram of the partial payments processing method of the present invention, reflecting the default handling as well as the instructed management of partial payments.

FIG. 4C.2–2 shows further detail of FIG. 4C.2 and is a flow diagram of the processing of rescheduled payments.

FIG. 4D.1 shows further detail of FIG. 4D and is a flow diagram of the liquidity support and credit enhancement features of the present invention.

DESCRIPTION OF THE PREFERRED EMBODIMENT

As an incentive to the adoption of the invention in practice, the preferred embodiment contains features that enable it to take over the entire billing, receivables, and collection process from service establishments, and thus represents the most comprehensive implementation of the inventive process. To accomplish this, the preferred embodiment contains features designed not only to execute the inventive principles, but also to enable it to function effectively as a commercially efficient intermediary between service establishments and financial institutions. These features include, for example, specialized methods of analyzing and managing household receivables and collection risks; methods of calculating risk-adjusted household obligation values; methods of addressing partial, rescheduled, and deferred payments; and methods of enhancing the liquidity and creditworthiness of the settlements exchange in meeting its aggregate payment obligations to service establishments, even in the event of payment shortfalls by households. However, it should be understood that the principles of the present invention equally apply to less comprehensive embodiments of the invention, for example, when serving only as an efficient intermediary for integrated billing, consolidation, aggregation, and settlement services.

Figure 1:
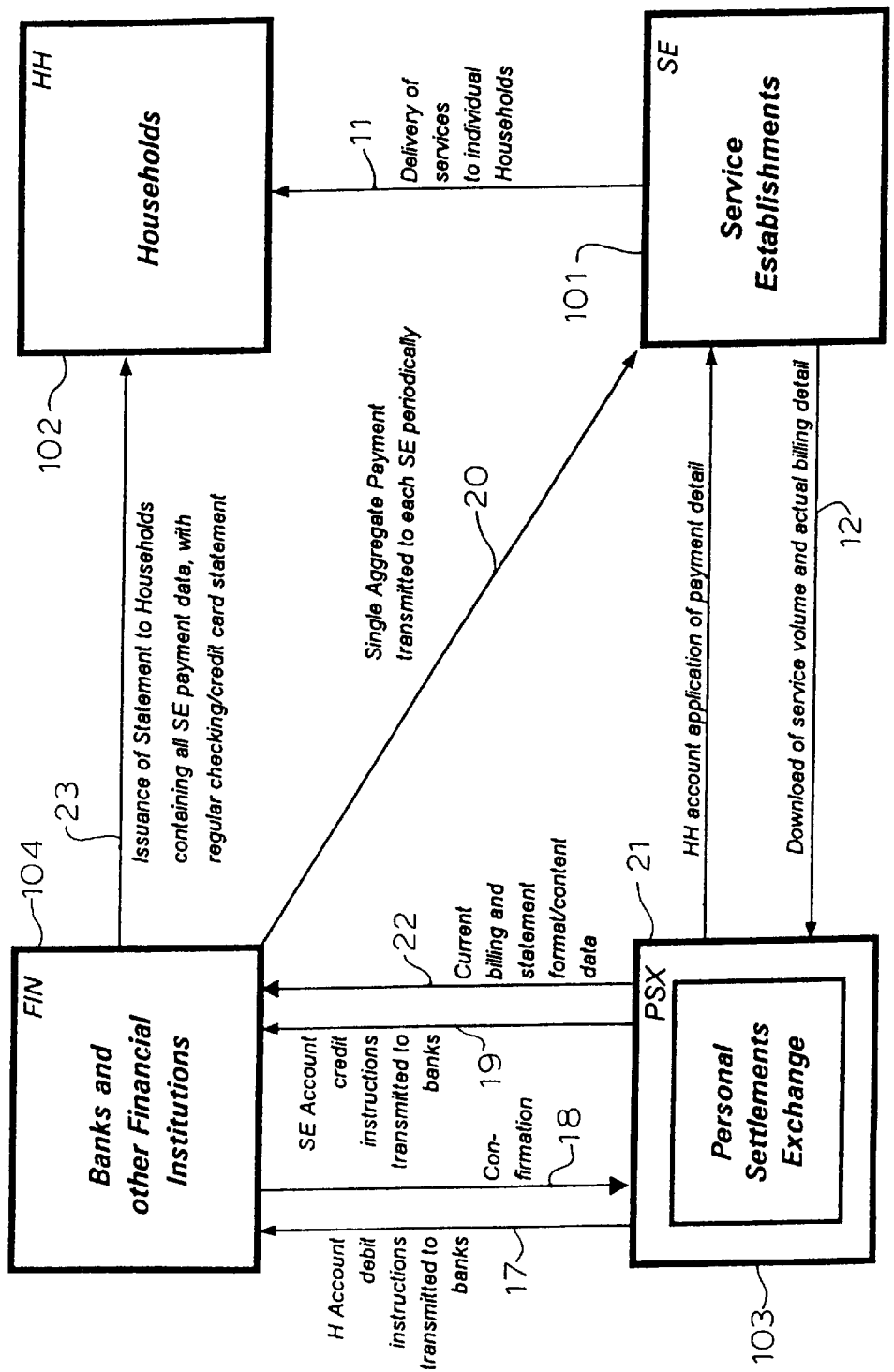
FIG. 1 is a block diagram of a payment environment in accordance with the principles of the present invention, showing the data and payment flows.

Referring first to FIG. 1, an overview block diagram of the major components of the payment environment of the inventive process is seen, showing the data and payment flows among the components. This is an overview drawing, and several data flows (such as confirmations and verification transmissions) are not shown, but are fully described in the accompanying figures. Service establishments (SE) 101 deliver 11 goods and services to households (HH) 102 and download their service volume and billing detail 12 to a personal settlements exchange (PSX) 103. The personal settlements exchange (PSX) 103 processes this information in several ways, including calculating a payment for each household (HH) 102 (potentially adjusted for the risk of slow, partial and default payments) to each service establishment (SE) 101. This set of payments is consolidated for each household (HH) 102 into a consolidated actual or consolidated proforma payment representing the total obligation value computed for each household.

With this processing completed, the personal settlements exchange (PSX) 103 issues a set of debit instructions 17 to all financial institutions (FIN) 104, including banks, from which households (HH) 102 wish to have their payments made. These financial institutions (FIN) 104 receive and store these instructions, and then debit their individual household members' accounts for the proforma or actual consolidated payment amount (using electronic debit or credit/charge card debit) as instructed by the personal settlements exchange (PSX) 103, and issue payment confirmation 18 to the personal settlements exchange (PSX) 103. The personal settlements exchange (PSX) 103 processes any partial or delayed payments to maximize its cash collections.

The personal settlements exchange (PSX) 103 then issues to financial institutions (FIN) 104 detailed instructions to execute the crediting (payment) of service establishment (SE) 101 financial accounts. These financial institutions (FIN) 104 then issue high-value, aggregated electronic transfers 20 to each service establishment (SE) 101 on behalf of the households from which they have received payments during that period, in accordance with the instructions 17, 19 received from the personal settlements exchange (PSX) 103.

The personal settlements exchange (PSX) 103 may or may not supplement these payments from its own reserves in order to meet payment commitments to those service establishments (SE) 101 for which the personal settlements exchange (PSX) 103 takes on full receivables and collection responsibility. The personal settlements exchange (PSX) 103 then issues 21 to each service establishment (SE) 101 cash application detail to accurately inform the service establishments (SE) 101 which households have paid their bills. Finally, based on the confirmed payments, as well as current period billing information, the personal settlements exchange (PSX) 103 transmits 22 to each financial institution (FIN) 104 the information needed to generate the next period's consolidated statement of payments received and payments due to each service establishment (SE) 101. The financial institutions (FIN) 104 then issue 23 a consolidated billing statement to households (HH) 102, containing all service establishment (SE) 101 data on payments made, current billings, service consumption, and next payment date, among other potential items of information, including advertising and promotional messages that service establishments may wish to communicate to their household accounts.

Figure 2:
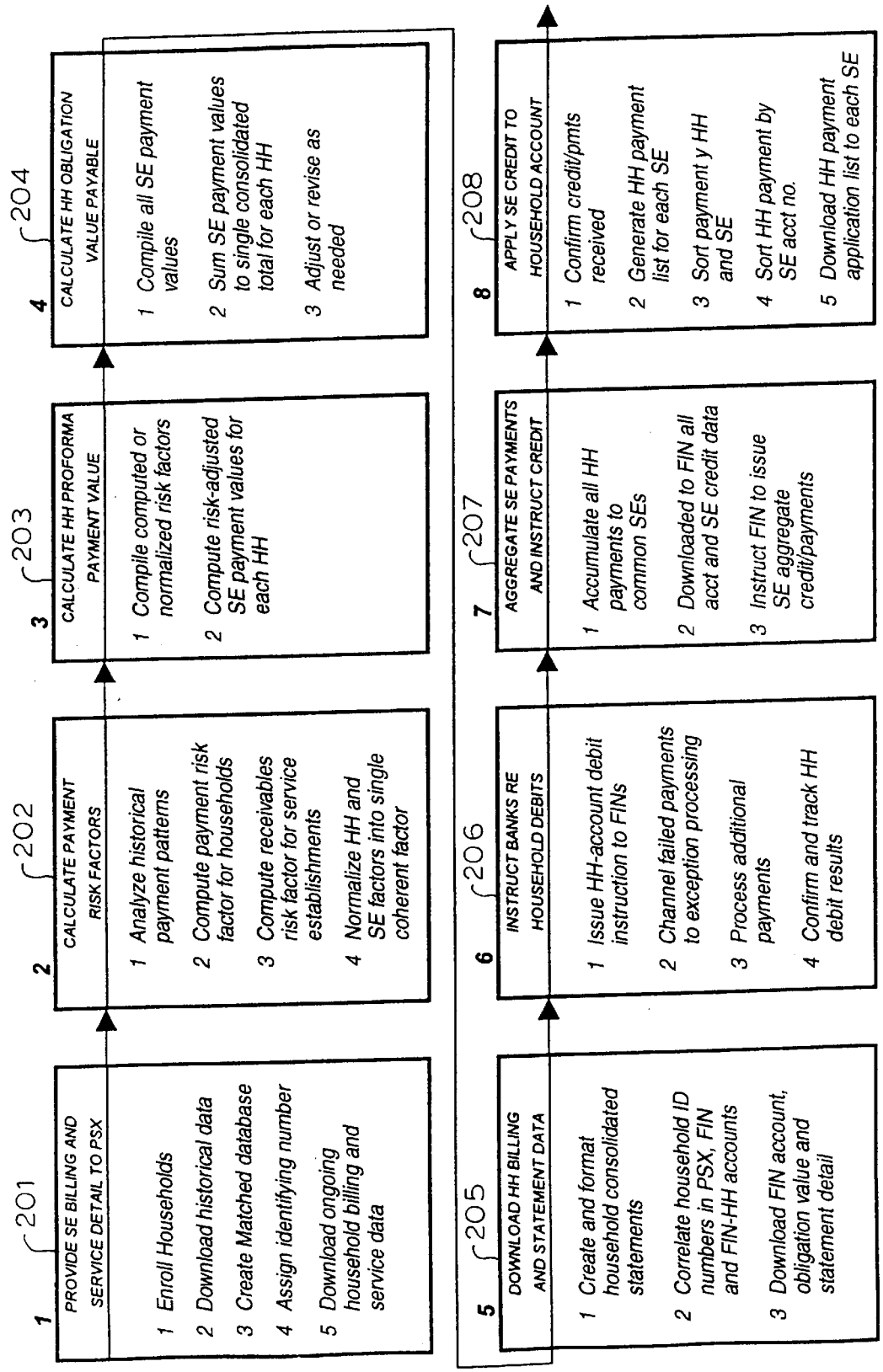
FIG. 2 shows the core computer-implemented processes which work together to create a personal settlements exchange in accordance with the principles of the present invention.

FIG. 2 shows the computer-implemented core processes which work together to execute the personal settlements exchange (PSX) processes just described. These processes work in an integrated fashion, and are the foundation of achieving the invention's object of eliminating paper from the payment process. There are eight core processes 201 through 208, which perform the central functions of the inventive process.

Functional process 201 is a method of providing the personal settlements exchange (PSX) with actual billing and service detail from service establishment (SE) and financial institutions (FIN). This process is invoked during the initial enrollment of households (HH) by financial institutions (FIN) or by service establishment (SE), as well as during the periodic updating of the system during each round of payments, for example monthly. In this functional process, the initial and continuing database of the system is established and complete bank and service establishment identifying information is entered. Process 201 involves the following general steps:

(i) enrolling households (HH) in the personal settlements exchange (PSX);

(ii) downloading historical household data from financial institutions (FIN) and other service establishment (SE);

(iii) creating a matched database of households (HH) and their respective service establishment (SE) and financial institutions (FIN);

(iv) assigning a unique identifying number to each household data file;

(v) downloading service establishment billing and service data on a continuing basis.

Process 202 is a method of calculating the payment risk factors associated with assuming receivables and collection risk on behalf of service establishment (SE). The preferred embodiment assumes that the personal settlements exchange (PSX) takes on this responsibility fully. In order to manage the potential for payment delays and shortfalls, the personal settlements exchange (PSX) evaluates, based on historical performance, the existence and degree risk associated and determines a risk premium to be added to household payments. Importantly, the calculation involves both a direct and an indirect (or normalizing) calculation, resulting in a spreading of the payment risk across the universe of households (HH) paying a given service establishment (SE). The following are the major steps in the evaluation process:

(i) analyzing historical payment patterns verses. due dates and timing for all service establishment (SE), financial institutions (FIN) serving households (HH);

(ii) computing a payment risk factor for households (HH);

(iii) computing a receivables risk factor for service establishment (SE);

(iv) normalizing the household (HH) and service establishment (SE) risk factors into a single coherent factor.

Process 203 compiles the results of the risk factor calculations and applies them directly to adjusting the payments due from households (HH). The result is a risk-adjusted, or proforma, payment which improves the odds that the personal settlements exchange (PSX) will receive timely and full payment. Key steps include:

(i) compiling computed or normalized risk factors;

(ii) computing risk-adjusted service establishment-specific payments for each household (HH).

Process 204 is a method of calculating an obligation value for each household (HH). The objective is to arrive at a single monetary value of payments that the household (HH) will make on a continuing basis to settle all of its service establishment (SE) obligations. In practice, this amount can be a variable periodic amount or a level payment, and may or may not include the risk adjustments noted earlier. In the preferred embodiment, we have assumed a constant or level payment, and we have added the earlier steps to protect the personal settlements exchange (PSX) from the risks inherent in carrying the receivables and collection responsibility on behalf of service establishment (SE) and financial institutions (FIN). With these special features in mind, process 204 involves the following general steps:

(i) compiling the computed and normalized risk-adjustment factors with which to adjust each household's payment or obligation value to each service establishment if needed;

(ii) consolidating all household service establishment payment obligations into a single value;

(iii) further calculating a constant consolidated obligation value.

Functional process 205 provides a method of downloading the obligation value, service establishment (SE) billing data, and billing statement content and format detail from the personal settlements exchange (PSX) to each household's (HH) financial institution (FIN). The goal of this process is twofold: first, to send information to the financial institutions (FIN) that will enable them to know the specific household (HH) accounts to be debited for payment and the correct debit amounts; and, second, to provide the financial institutions (FIN) with the information needed to create, format, and inform the generation of consolidated household (HH) obligation statements. These consolidated statements represent a combined list of all payments made, payments due, service establishment service consumption data, promotional materials, and any other items that might reasonably be included in a combined statement for all service establishment (SE). It is understood that while we have identified financial institutions (FIN) as the conduit for this information, any intermediary serving this function is equally encompassed. Execution of the following steps accomplishes these goals:

(i) establishing an electronic connection and language protocols between the personal settlements exchange (PSX) and the financial institutions (FIN);

(ii) creating and formatting of household (HH) consolidated billing and service statements;

(iii) correlating household (HH) personal settlements exchange (PSX) identification number data with household (HH) financial institution (FIN) and specific account identifying numbers;

(iv) downloading household (HH) bank account numbers, consolidated obligation values of households (HH), household service consumption data, and billing statement format and content detail to financial institutions (FIN).

Functional process 206 is a method of instructing financial institutions (FIN) to electronically debit from or charge to the household (HH) account, the consolidated obligation value. The purpose of this step is to move from the information results achieved in the prior processes to effecting actual cash and value transactions in the banking or payments network sector. In the preferred embodiment, in which the receivables and collection risk is borne by the personal settlements exchange (PSX) on the behalf of service establishment (SE), this process also contains an exception management system for processing late and partial payments from households (HH). A specialized exception management function is desirable in any large-scale payment processing system, so that as high a percentage as possible of members enrolled in the system can be retained, rather than rejected for payment deficiencies. Households (HH) that cannot be retained create a costly processing problem for service establishment (SE) and financial institutions (FIN) alike; they continue to use household (HH) services and to eventually pay for them, but they force the maintenance of alternate systems for handling these exception cases. The most efficient solution is the design and operation of a highly automated process for managing exception cases inside the personal settlements exchange (PSX) itself. In the preferred embodiment, process 206 executes the following steps toward this end:

(i) issuing household-account debit instructions to financial institutions (FIN);

(ii) channeling failed payments or specially designated household accounts to an exception handling system;

(iii) processing additional payments generated from exception management;

(iv) confirming debited payments from households (HH), including exception cases, including tracking by bank, household account, and amount of debit or charge.

Functional process 207 is a method of making single, aggregate payments to service establishment (SE). The goal of this process is to transfer from financial institutions (FIN) to service establishment (SE) the cash value that has been debited from service-consuming households (HH) and held pending payment to service establishment (SE). The steps for transferring these payments from financial institutions (FIN) to service establishment (SE) are as follows:

(i) accumulating into a single amount all of the household obligation (HH) values destined for the same service establishment (SE);

(ii) downloading to selected financial institutions (FIN), their intermediaries, or payment networks, account identification data and crediting information for service establishment (SE);

(iii) instructing financial institutions (FIN) to issue the aggregate value of the collected payments to service establishment (SE) designated.

Functional process 208 provides a method of identifying to service establishment (SE) the accurate application of the aggregate payments received to the individual household accounts (HH). The goal of process 206 is to effect the transition from payment (which has already taken place with the aggregate transfer) to actual settlement through posting to individual household accounts (HH). With this step households (HH) are ensured of knowing that their accounts are settled, and service establishment (SE) are ensured of knowing which households (HH) have paid for services consumed. The following steps are envisioned in the invention:

(i) confirming correspondence between aggregate payments made and the payment instructions;

(ii) generating a list of individual households (HH) and their corresponding payments by service establishment;

(iii) sorting the household payments list by service establishment;

(iv) sorting the service establishment specific household payments list by service establishment account number;

(v) downloading electronically or by other means to service establishment (SE), the list of applied household account payments specific to the service establishment in question.

Figure 3:
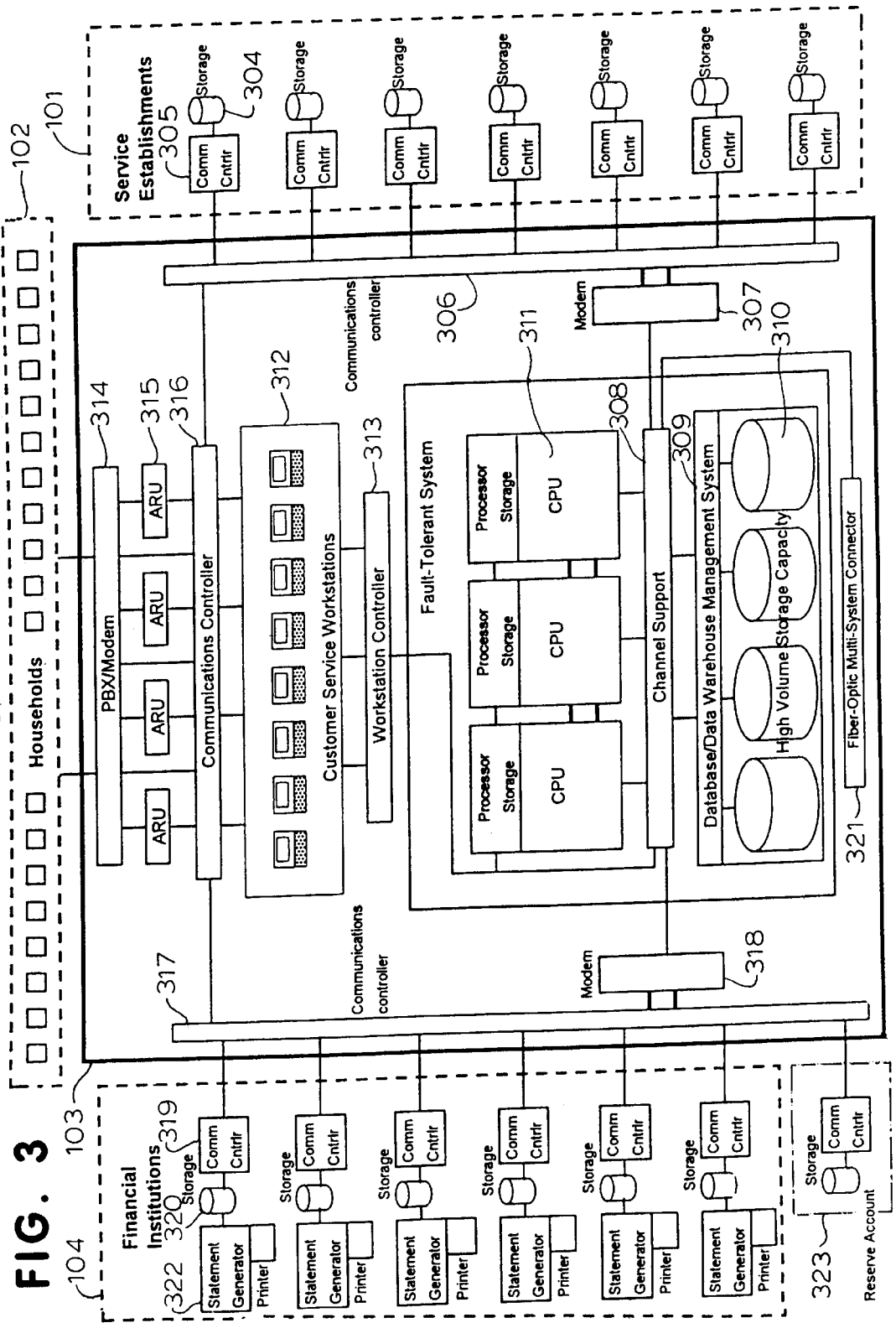
FIG. 3 is an exemplary hardware configuration and apparatus for carrying out the information processing, communications, database management, and operational methodology in accordance with the principles of the present invention.

FIG. 3 shows an exemplary hardware configuration and apparatus for carrying out the information processing, communications, database management, and operational methodology of the present invention. In the preferred embodiment, this hardware equipment configuration would be installed at a central or regional processing center, and would contain communication means to connect it with service establishments (SE) 101 and financial institutions (FIN) 104.

The personal settlements exchange (PSX) 103 is composed of a communications controller 306 which links multiple data lines from service establishment (SE) storage systems 304 and communications controllers 305. Service establishments (SE) and the personal settlements exchange (PSX) communicate service, billing, and payment data over these apparatus. Modem 307 enables the data lines to communicate with the personal settlements exchange (PSX) computing system by way of a channel support interface 308 which coordinates communications and data transfer among the modem 307, database management and data warehouse systems 309, the central processing unit (CPU) 311 of the personal settlements system, and electronic linkages to other regional processing centers through the multi-system connector 321. The database management system 309 is connected to high-volume storage facilities 310 which house the integrated database of household (HH), financial institutions (FIN) and service establishment (SE) data. Customer service workstations 312 are provided for telephone and electronic communication between households (HH) 102, financial institutions (FIN) 104, and service establishment (SE) 101; and the workstation controller 313 manages the linkage to the computer system central processing unit (CPU) 311.

Households (HH) 102 and customer service representatives 312 can communicate by telephone or computer through private branch exchange (PBX) 314 and modem system 314. A network of audio response units (ARU) 315 intercepts and channels calls by providing a menu of call options for customers to minimize the staffing level needed to manage high-volume telephone traffic. The communications controllers 306, 316, 317 manage the voice traffic flow between the personal settlements exchange (PSX) 103, service establishments (SE) 101, and financial institutions (FIN) 104, while system-to-system data communications are handled across modems 307 and 318. In the financial institutions (FIN) 104, communications controllers 319 receive and manage data flow to and from personal settlements exchange (PSX) 103, storing data in storage devices 320 as needed for transaction support, as well as for the compilation and generation of consolidated household (HH) statements by statement compilers 322. At least one of the financial institutions (FIN) 104 linked to the personal settlements exchange (PSX) network would house the reserve accounts 323 which are linked electronically to the personal settlements exchange (PSX) 103 in order to provide a dedicated channel for directing the accumulation or drawdown of reserve funds to support the ability of the personal settlements exchange (PSX) 103 to pay service establishments (SE) 101.

In time period t=0, before the first payment cycle is initiated, financial institutions (FIN) 104 and service establishments (SE) 101 subscribe to the system. Millions of consumer households (HH) could be introduced to the system through subscription by service establishments (SE) 101 and financial institutions (FIN) 104. Financial institutions (FIN) 104 are especially valuable as subscribers because of their ability to deliver millions of their account-holding customers and because these account holders already use checking accounts at these same institutions to make monthly recurrent payments to the same service establishments (SE) 101 that will become subscribers and payees in the present system.

FIG. 4 is a flow diagram in five (5) parts, A through E, which shows the overall functioning and methodology of the system in terms of computer-implemented instructions of the present invention. FIG. 4A shows the creation and updating of the initial databases for new subscribers to the system, and the manner in which the financial institutions (FIN), service establishments (SE), and household (HH) databases are correlated and labeled with a unique identifying personal settlements exchange (PSX) account number for overall tracking and control of the transactions in the system. FIG. 4B provides an overview of the method by which household (HH) payment risk is evaluated and the proforma payment amounts calculated for each household (HH) and by each service establishment (SE). FIG. 4C illustrates the processing of a payment cycle, including the handling of partial and delayed payments through the exception management system of the present invention. FIG. 4D identifies the elements and relationships in creating and managing a personal settlements exchange (PSX) liquidity reserve. FIG. 4E shows the flow detail underlying actual settlement: payment application and crediting to account, notification to service establishment (SE) of payment, and updating of system databases in preparation for the next payment cycle.

Referring first to FIG. 4A, the data received from service establishments (SE) and financial institutions (FIN) is uploaded 404, 405 to storage 406, matched across financial institution (FIN) and service establishment (SE) data by common household (HH) identifiers 407, tested for file-matching 408, and then labeled 409 with a unique personal settlements exchange (PSX) identifying number. Once filtered for duplication, and completed matches, the entries are arrayed 410 in a database containing or linked 410 to the historical information transferred from financial institution (FIN) and service establishment (SE) source files.

The resulting conceptual database contains relational data structures capable of being viewed from household (HH), financial institution (FIN), or service establishment (SE) perspectives or views. The representative detail shown in FIG. 4A.1 shows a conceptual relational database 450 representing the combined household (HH), service establishment (SE), and financial institution (FIN) databases of the personal settlements exchange (PSX) such as created in FIG. 4A. Households (HH) are indexed as HH(i) i through 1, with I being the total number of households (HH) in the system. Service establishments SE(j) are indexed j through J, with J being the total number of service establishment (SE) in the system. Financial institutions FIN(f) are indexed f through F, with F being the total number of financial institutions (FIN) in the system. Within any SE(j), there are number-identified household (HH) service accounts (such as the electric utility account number for a specific household (HH)) i through I for each SE(j). Households (HH) and service establishment (SE) may each own more than one financial account, and for each financial institution FIN(f), there are financial accounts k through K belonging to households HH(i), and, I through L, for financial accounts belonging to service establishment (SE). At any point in time T=t, the relational databases contain data specific to that time period. Historical data is in system memory as snapshots of data tables at time T=t less than the current value of t. A PSX(i) identifying number is assigned to each record of the database, and can serve as a key to accessing and retrieving any view of the database, primarily using the household (HH) as the search reference.

Database 451 shows the household (HH) database contained in 450, exploded to provide additional detail. For each data record or file, HH(i), the database contains the service establishment SE(j) account number for all of HH(i) SE accounts j. This database contains the record of the volume of household (HH) service consumption or usage, HH(i)(j)V, and its billable value, HH(i)(j)$. It is understood that the "$" symbol is shorthand notation for any currency in any form that may be used. A corresponding PSX# is keyed to each household (HH) record in the database to serve as a common identifying link between databases.

Database 452 is the service establishment (SE) dataview. In this representation, the notation V for volume of services and $ for value of billables is the same as in database 451. In the present case, SE(j)(i)# is the service establishment j account number or reference number for its service relationship with household, HH(i), and the variables SE(j)(i)V and SE(j)(i)$ represent the actual volume of services provided and their corresponding actual or billable cost. In the far right column of conceptual database 452, each service establishment (SE) is shown to have a number of PSX # household (HH) identifiers, i, . . . I associated, and these are in a one-to-one mapping back to service establishment (SE) household accounts, and provide the database relational key to other views of the data.

Database 453 is the financial institution (FIN) dataview, FIN(f), explosion of database 450. The column designations indicate the following data elements: FIN(f)(i)(k)#&$ is shorthand definition of the financial account, k, belonging to household HH(i), in financial institution (FIN) f, designated by the account number # and with a value balance of $. Similarly, service establishment SE(j) holds account I at financial institution f, with corresponding account number, #, and value $. The unique data reference, PSX(i)(j)(f)$ represents the value of dollar flows (billable, billed, payable, or paid) at financial institution f between household i and service establishment j.

When this value is summed across all households HH(i) for a given service establishment SE(j), the result is the aggregate value of all cash transfers to be paid to service establishment SE(j) from household (HH) accounts at financial institution f. Alternatively, and with the same value, PSX(i)(j)(f)$ represents the amount billed in period t. In variants of the system, $ and V may denote actual, proforma, estimated, cumulative, historical, or other perspectives on value $ and volume V of service consumption. When summed across all financial institutions (FIN), FIN(f), the result is the total cash value in the system to be paid from all households (HH) from all financial institutions (FIN) to SE(j). In the normal course, any difference in $ across all households (HH) volume verses their service establishment (SE) indicates a surplus or deficit in payments.

Databases 454 (for households (HH)) and 455 (for service establishments (SE)) enable the data arrays HH 451 and SE 452 to be matched with their respective financial account data from array FIN 453 in the personal settlements exchange (PSX). In each, the view from the household (HH) or service exchange (SE) perspective is married with the corresponding financial institution (FIN) account ownership and values to identify for households (HH) the availability and source of funds from households (HH) to be used to settle household (HH) obligations to service establishments (SE) in time period T=t, and for service establishment (SE), the corresponding credit to SE accounts with respect to billings requiring settlement.

The final database of FIG. 4A.1 is the settlement matrix 456, combining the financial institution (FIN) transform database elements for both household (HH) and service establishments (SE) with the required value flows from the financial institution (FIN) database 453. Together, these relational structures identify the required debits, satisfying payments, and source and destination financial accounts for effecting settlement of all system obligations in time period T=t. The settlement database is conceptually the detailed mapping from overall financial institution (FIN), households (HH), and service establishments (SE) sets to specific and unique HH(i), SE(j), FIN(f) elements to household (HH) source account, k, and receiving service establishment (SE) account I. In summary, the relational data structures in FIG. 4A.1 provide the linkage between the financial accounts to be used by the household (HH) and by the service establishment (SE), in a mapping denoted as the settlement database 456. Consequently, the database construction and its continuous updating and management provide a direct mapping from the household (HH) account to the service establishment (SE) account through the financial institutions (FIN) used by each party for each time period t. The result is the ability to understand and eventually direct payment flows from one account to the other using the designated financial institutions (FIN) of each and capturing the exact values billable, billed, payable or paid.

The dimensions of the databases of FIG. 4A.1 embrace all financial institutions (FIN), all service establishments (SE), service establishment (SE) financial accounts, all households (HH), and household (HH) financial accounts registered with the system. In many cases, financial institutions (FIN) will also be service establishments (SE) and will receive payments. For example, a financial institution (FIN) that provides checking accounts and brokerage services, car loans, and a mortgage to the same household (HH) will have the financial institution (FIN) checking accounts registered as payment accounts for direct debit, the auto and mortgage loans registered as service establishments (SE) which receive payments, and the brokerage account registered as both financial institutions (FIN) and service establishments (SE) accounts, since it may be a recipient of funds for services in the brokerage mode, and a source of funds in the payment mode. Accordingly, it is possible to have the same account registered as both service establishment (SE) and financial institution (FIN), depending on the inward versus outward direction of funds flow expected. Funds may also flow to financial institution (FIN) accounts ordinarily used for payments out, in the case of credits or refunds, which the personal settlements exchange (PSX) is also equipped to handle.

At any point in time, the settlement database may be in or out of balance. While the amount billed to household HH(i) by service establishment SE(j) is represented by SE(j)(i)$ will be identical to the amount due to service establishment SE(j) from the household HH(i), the actual payment may be greater (putting the system into surplus) or less (deficit) than this amount. The total net value of all system surplus and deficit payments represents the amount which, in the preferred embodiment, the personal settlements exchange (PSX) would be out of balance. Deficits would need supplementing from reserve accounts, and surplus funds would be put into a reserve to maintain that fund as protection against future shortfalls. Finally, the personal settlements exchange (PSX) charges a small fee for services provided. These charges will change flow values slightly if payments to service establishment (SE) are made net of deductions for these charges.

Further to the interpretation of the settlement matrix database 456, for any horizontal data vector f in 456, the summation of PSX(l)(j)(f)$ across all households HH(i) with financial accounts in financial institutions FIN(f) for payment to service establishment SE(j) is another representation of the aggregate payment due to that service establishment (SE) from households (HH) paying through financial institution FIN(f).

Additional detail on the potential structure of the records in the household (HH) and service establishment (SE) databases is provided in FIG. 4A.1–1, which is an expanded detail of FIG. 4A.1. The central identifying and matching data key is the household (HH) personal settlements exchange (PSX) identification number (HH-personal settlements exchange #) in record 461, which is common to all database views of the same household (HH). In records 464, for example, each household (HH) in the service establishment (SE) database view is identified in the personal settlements exchange (PSX) with the HH-personal settlements exchange (PSX) identifier. In addition, the unique personal settlements exchange (PSX) identifier for each service establishment (SE) is also reflected in the records of each household (HH), which is a subscriber to the services of the service establishment (SE). From the standpoint of dimensions, each service establishment (SE) record could contain millions of customer accounts, and for each household (HH), there might be a handful of service establishments (SE) providing basic household (HH) services, and tens of others for additional services.

Referring now to FIG. 4B, the payment risk analysis and the computation of proforma payments which help manage payment risk are detailed. Step 502 provides for the analysis of historical payment performance by households (HH). Payment risk is characterized statistically, and calculated 503 for both households (HH) and service establishment (SE), and then made consistent through a normalization process 504. The normalization calculation serves two purposes: (a) providing an aggregate measure of the overall payment risk to a specific service establishment (SE), and (b) providing a baseline for assessing whether a particular household (HH) is a higher or lower payment risk than the universe of households (HH) served by the service establishment (SE) in question.

When the risk factor is applied to the payment due from each household (HH), the risk-adjusted proforma payments are greater than payments that would be due solely based on actual service consumption. However, the large population effect operating through the normalization process will tend to attenuate the impact of both extreme risk cases and exceedingly reliable payers, reducing the amount of premium that need be paid by a specific household (HH). The present invention calculates these household (HH), service establishment (SE) and normalized risk factors, and applies it 505 to the payment flows to derive the risk-adjusted or proforma payment required. The proforma obligation can be, as in the present embodiment, a consolidated value combining 506 all individual payments due to service establishment (SE) into a single periodic obligation.

Referring to FIG. 4B.1, the detailed computation of payment risk factors proceeds in three phases: first, across households (HH); second, across service establishment (SE); and then normalized between both. These major phases and their related detailed computational steps are as follows:

In Phase 1, we determine household payment risk for each service establishment (SE) across all service establishments (SE), using the following steps:

(i) analyzing 551 historical payment patterns and service utilization by household (HH);

(ii) evaluating the 552 difference between the amount of payments received from households (HH) and the amount due;

(iii) evaluating 553 the difference in timing between receipt of payment from households (HH) to service establishment (SE) and the due date of the payments;

(iv) applying 554 an internal interest rate to projected variances in time and amount to determine the potential costs associated with late or insufficient payments;

(v) computing 555 the household (HH) payment risk factor for each household (HH) and each of its respective service establishment (SE), individually;

(vi) repeating for all service establishment (SE) and households (HH) 556, 557.

In the second phase of the payment risk factor calculation, we determine the service establishment (SE) specific receivables risk. The central steps in developing the service establishment (SE) receivables risk factor are:

(i) analyzing historical payment patterns and service utilization for each service establishment (SE);

(ii) evaluating 559 the difference between the amount of payments received from households (HH) and the amount due;

(iii) evaluating 560 the difference in timing between receipt of payment from households (HH) to service establishment (SE) and the due dates of the payments;

(iv) computing 561 the household (HH) receivables risk factor for each service establishment (SE);

(v) repeating 562 for all service establishment (SE).

The final phase of payment risk factor analysis is a method of adjusting the payment risk factors of households (HH) by normalizing them to the receivables risk faced by service establishment (SE). Application of solely a household (HH) specific risk-adjustment factor to an individual household's )HH) payments might provide for an excessive incremental risk premium payment, leading to aggravation of the payment risk that the system is trying to minimize. By contrast, when modified by the overall payment risk of the service establishment (SE) across all households (HH) served, the risk of charging too high a premium is reduced. Three steps are involved in this final phase of payment risk factor analysis 563:

(i) comparing the service establishment (SE) receivables-risk factor coefficient to the household (HH) payment risk factor coefficient;

(ii) determining the algebraic relationship between the two different factors; and (iii) computing an adjusted payment risk factor for each household (HH) for each service establishment (SE) to which payments are made.

In summary, then, there are three key dimensions to analyzing and spreading the payment risk of households (HH) to service establishment (SE): variance in time and amount measured across service establishment (SE) for a specific household (HH); the same captured across households (HH) for a specific service establishment (SE); and both normalized to arrive at an internally consistent pooled factor applicable to the payment in question.

In addition to using risk factors to adjust household payments, the process can also be used as a flag for automatically transferring 563 certain households (HH) with a payment risk factor (PRF) in excess of a threshold level to special handling in the exception management system of the present invention. There, the household (HH) can be put into a deferred, rescheduled, or extended payment plan which would lower the likelihood of default, and encourage consistent and reliable payments.

FIG. 4B contemplates three unique payment values: first, the periodic payment amount payable 505 by household HH(i) to service establishment SE(j) which we have just addressed; second, the consolidated periodic payment amount 506 due from specific household HH(i) to all service establishments SE(j) serving household HH(i); and finally, the aggregate payment amount due 507 from all households (HH) to a specific SE(j). Referring now to FIG. 4B.2, further detail of consolidated and aggregate payment calculations is seen. FIG. 4B.2 is a flow diagram of the actual computation of proforma payments or obligation values from consuming households (HH) to service establishments (SE).

The specific steps in calculating the household (HH) specific periodic payment amount are:

(i) retrieving 571 historical billing information;

(ii) computing 572 the initial periodic payment amount from household HH(l) to service establishment SE(j), based on the arithmetic average or statistically projected amount;

(iii) retrieving 573 the normalized household payment risk factor calculated in the payment risk factor process;

(iv) computing 574 the proforma period payment amount using the above inputs. This results in a single, constant risk-adjusted payment amount unique to each household, for payments to singular SE(j).

The consolidated household payment value is derived from the following steps:

(i) repeat 575 for all service establishments SE(j) serving household HH(l);

(ii) compute 576 the consolidated proforma periodic payment amount sufficient to paying all service establishment (SE) serving household HH(l). The result is a constant consolidated payment amount for paying a plurality of SE's serving the household.

The inventive process contemplates each service establishment (SE) receiving from the financial institutions (FIN) served by each household (HH), a constant stream of cash payments on a routine periodic basis. So, instead of making out bills to millions of individual households (HH); incurring the risk of credit and collection; receiving, recording, and crediting payments; and evaluating the volatile profit and loss and balance sheet impact of a given period's service and billings; each service establishment (SE) simply receives with certainty a fixed dollar amount from one or several financial institutions (FIN). Referring again to FIG. 4B.2, the calculation of these aggregate (HH) household payments proceeds in the following steps:

(i) repeat 577 the calculation of household consolidated proforma payments for all households (HH) in the population;

(ii) calculate 579 the total proforma periodic payments from all households (HH) to specific SE(j);

(iii) repeat 580 for all service establishment (SE) in the network.

FIG. 4C is a flow diagram outlining the system payment cycle of the invention. Its function and corresponding execution in the data processing components shown in FIG. 3 will now be described. Individual service establishments (SE) download 601, 602 their period service and billing detail data to the personal settlements exchange (PSX) 103 (FIG. 3) from the storage devices 304 and communications controllers 305, through the modem 307 and channel support devices 308 of the personal settlements exchange (PSX) of the present invention. The information is then directed to the database management system 309 for incorporation into the matched and labeled functional database 410 (FIG. 4A). This information is stored 602 (FIG. 4C) in the storage devices 310 (FIG. 3), and processing is executed in the data processing devices 311 of the personal settlements exchange (PSX) system 307 to 311, (FIG. 3). This information is processed 603 in the personal settlements exchange (PSX) data processing system 311 (FIG. 3) and then uploaded 604 to the financial institution (FIN) data processing system where it is stored 605 for later use in generating consolidated billing statements through statement generators 322 and later issued to household (HH) customers. Data communication, uploading, and storage is executed through the personal settlements exchange (PSX) devices 311 personal settlements exchange (PSX) 103 central processing unit (CPU) 311, channel support device 308, modem 318, and communications controller 317. In the financial institution (FIN) sector, the communications controller 319 manages the data flow from the personal settlements exchange (PSX) to the financial institution (FIN), finally leading to storage devices 320. It is anticipated that all communications among the personal settlements exchange (PSX), financial institutions (FIN), and service establishment (SE) would be encrypted for security.

FIG. 4C.1 provides further detail of FIG. 4C, and is a flow diagram of the processing of service establishments (SE) service and billing data received from each service establishment (SE) for the current payment cycle. In this subroutine, accounts may be coded and flagged for special handling as appropriate. Service establishment (SE) transmissions are first authenticated 631 for security purposes, and the identity of the source service establishment (SE) is verified through its registered service establishment (SE) personal settlements exchange (PSX) identification as well as through periodically changed authentication codes. A data matching process is performed 632 to accurately create and update the household (HH) service and billing data for the period, consistently tying these back to the correct household (HH) identifiers PSX-HH# 632, 633. These database updates prime the system for the current period's billing and payment instructions. Before further processing, special file codes, status indicators, and tolerance limits are identified 634 and processed to cue the data processing system to special requirements, new information, unique file handling, or other distinctive processing needs. If special handling is required 635, the system tests for whether such handling is new to the system 636 or constitutes a repeat of handling performed or signaled in prior cycles.

New conditions, such as significantly higher service usage compared to prior periods, are specially flagged with new handling codes 637. Existing conditions or status codes, such as a system-wide promotion of discounting to encourage participation in the personal settlements exchange (PSX), for example, will be immediately recognized and, in both cases, the appropriate handling instruction is retrieved 638. These might encompass triggering alternate payment arrangements, adding interest charges, paying rebates, or making promotional adjustments, according to the specific conditions present in the service establishment (SE) data file for the period in question.

With the service establishment (SE) data file now downloaded and condition statements prepared, the individual household (HH) payment file is retrieved and processed 639. In the systems environment of FIG. 3, database management 309, storage system 310, and central processing unit (CPU) 311 are where these activities are centered. In most cases it will be efficient to use temporary storage in so-called cache memory to process individual household (HH) current period file records to minimize the continual access to and retrieval from high capacity storage devices through the transaction processing cycle. During processing of each service establishment (SE)'s data file, the household (HH) specific charges and services are compiled for each household (HH) file in the universe of households (HH) served by the service establishment (SE) and registered 640 with the personal settlements exchange (PSX). At the same time, the basis for a consolidated household (HH) statement is being compiled 641 for the current payment cycle. This processing is repeated 642, 643 for all households HH(i) and all service establishments SE(j), respectively, until the complete period consolidated debit amount is compiled. Then the system is returned to upload 604 in FIG. 4C.

Reference to FIG. 4C.1–1 shows yet additional detail on the nature of the processing which each service establishment (SE) data file record might undergo in the preferred embodiment. This further detail is consistent with both the conceptual database model 452 (FIG. 4A.1) and the more detailed illustrative database model of the service establishment database view 463, 464 (FIG. 4A.1-1), which is repeated in high-level schematic as 661 of FIG. 4C.1–1. The data fields of the downloaded service establishment (SE) records contain specific information 663 with the following detail and function:

1. The data record contains HH-PSX#, the unique identifying number for households HH(l) keying to all other personal service exchange (PSX) databases and data views, including other service establishment (SE), financial institutions (FIN) and historical transactions and profile data.

2. The data record also contains the unique personal service exchange (PSX) identifying number for the current transmitting service establishment SE(j), identifying it to the personal settlements exchange (PSX), and triggering links to other elements of the process system in personal settlement exchange (PSX), such as retrieval of financial institution (FIN) accounts associated with the service establishment (SE).

3. FIG. 4C.1–1 663 also shows the service establishment's (SE) internal account numbers for the households (HH) served. This data is used by the personal settlements exchange (PSX) as a secondary reference and internal payment-application account number, so payments made can be later associated with the household (HH) and the service establishment (SE) account code for accurate crediting of payments.

4. Data field 4 of 663 shows the current actual service consumption volume by household HH(i). After this information has been evaluated on an historical basis at the stage of initial enrollment, personal settlement exchange (PSX) tracks and cumulates service consumption patterns as part of the risk management programming described earlier. Earlier information on usage can be retrieved by searching for the same data on earlier T=t−n indexes in the database.

5. Similarly, data field 5 in 663 of the illustrative database record carries the current billing information consistent with the usage pattern of the household (HH) if, however the service establishment (SE) believes it is relevant to track such information. This may differ from actual, as for example, in the case of meter readings which are only physically carried out at quarter-end periods. The intervening months are necessarily estimates, and there is no more accurate information in the system to provide direct cost measurements.

6. The data file 663 also contains a field 6 with unique condition indicators or codes providing flags to the personal settlements exchange (PSX) indicating how the file should be handled in the personal settlements exchange (PSX) system. For example, referring to 4C.1 step 634 indicates that processing of service establishment (SE) billing data involves reading file codes and sorting on these codes for special handling. The personal settlements exchange (PSX) assigns, attaches, or revises these codes as needed 637, and then handles a particular file in the manner dictated by the code in question. These codes would dictate such factors as risk thresholds, promotional opportunities, cross-selling linkages, etc.

7. Additional fields cover the date and any additional fields for text messages. For example, special notes from customer service contacts might be appended to the file in this field.

Returning to FIG. 4C, the above processing and communication results in the transmission 605 of files containing consolidated proforma (or actual debit detail) for each household (HH) to financial institutions (FIN) throughout the region served by the personal settlements exchange (PSX). These debits are executed by each financial institution (FIN) receiving such instruction 606, and these transactions may or may not be successfully completed 607 for any number of reasons, especially related, for example, to the sufficiency of funds in the household (HH) account. The system will retry these debits for a certain number of times before rejecting the file out as a failed payment instance. If, on the other hand, the debit is successfully completed advice to that effect is created and issued 608, 609 to the personal settlements exchange (PSX) through the communication system between the financial institution (FIN) and the personal settlements exchange (PSX) sectors of the overall system (FIG. 3).

In the specific case that a debit or charge transaction has failed to execute in financial institution (FIN) 607, the failed debit is returned to the personal settlements exchange (PSX) exception management system 610 for further handling. In the unlikely event that exception management fails to correct the failed debit, or if further coordination between service establishments (SE) is needed for any reason, the personal settlements exchange (PSX) transfers the file or makes specific requests to the service establishment (SE) sector 611 which may move to terminate services 612, or in the alternative, allow the personal settlements exchange (PSX) to continue 610 with further management in the exception system.

A variety of methods are available in the exception management system in the personal settlements exchange (PSX), and these are designed to try every possible approach to retaining households (HH) within the personal settlements exchange (PSX), and keeping payments flowing, even if they are below the actual, proforma, or other desired level for a given period of time. In FIG. 4C.2, an exception instance or event is first identified as having occurred 651, and it is further identified as to type and severity in a table of exception events 652. Examples of representative exception events include, for example, partial payments, zero payment, negative risk factor changes, and technical payment failures. The specific event type has established handling protocols, and the manner in which these are invoked may, in some embodiments of the invention, depend on the condition and standing of the specific household (HH) data file record in question. For example, a file with a history of partial and zero payments will be managed under a different rule than one in which a partial payment had first been encountered.

In the present invention, this system rules table 653 might contain dozens of rules for the many permutations of exception event and household (HH) record status that might exist. The payment risk factors which are continually computed 555 (FIG. 4B.1), combined with the file handling codes assigned 637 for specific cause, would together constitute a matrix of household (HH) record status codes that, together with a specific event, would define the appropriate rules for managing 653 a specific exception event. Accordingly, the system rules table 653 contains automatic if/then conditional directives such as, "if a 50% or better partial payment is received from household HH(i) of standing good or better (based on history), then invoke rule R1 accepting payment and process under system procedures P-2, otherwise reject payment . . . "

Until a specific history is created for each household (HH) payment file, the payment risk factor (PRF) is likely to be the first determinant of system handling and rule application, simply based on the severity of the exception event. Alternatively, the data retrieval requirements may become so large that for efficiency the system may invoke rules uniformly and then retrieve files for status and history tracing as part of the application of systems procedures after the rules have been applied. This is the sequence depicted in FIG. 4C.2, in which the file for household HH(i) is retrieved 653, 654 after the event has occurred and the rules are applied, and the system then determines whether to proceed with additional processing under programmed exception procedures.

The exception management system in the personal settlements exchange (PSX) contains a system procedures table 654 seen in FIG. 4C.2, which manages the personal settlements exchange (PSX)'s handling of exception events under given rules. The exception management system selects the most important criterion for determining how the system should respond to a particular event, taking into account, for example, the rules, the household (HH) record history, the event encountered, and the time period within which the event should be resolved (e.g., within the current payment cycle). The exception management system also assigns special tracking codes based on event, file history, and the proposed resolution, and manages notification routines to financial institution (FIN) and service establishment (SE) sectors as appropriate. Finally, the procedures table selects the appropriate system response to an exception event by reference to an event response table 655. A range of responses is available, including, for example, retrying debits, shifting to alternate debit sources, allowing partial payments, rescheduling of payments over a longer time period, and contacting the customer for additional information or to confirm commitments to pay.

Once the event response is selected, handling is returned to the procedure table, which communicates as appropriate with service establishment (SE)'s and financial institutions (FIN), and assigns a tracking code based on the response selected. The database system is then updated 656 to reflect the event management and forward processing, and the exception routine is returned to transaction processing 610 to 607 as required, FIG. 4C. There, new payments may be processed, if appropriate, and the credit advice updated 608 to reflect payments, if any, before uploading to the personal settlements exchange (PSX) database.

In FIG. 4C.2–1, in which further detail is disclosed concerning the partial payment processing mechanism in the present invention, the partial payment processing method is identified, which is an expanded detail of the exception management system event response table options. As an example, the household (HH) consolidated obligations for the payment period in question total $1,335, and only $1,000 is received. In the preferred embodiment, the household (HH) file record is first retrieved 670 to determine the priority of payments that has been established by the household (HH) 671. If the first allocation of payment is to mortgage or rent, then the minimum amount of the partial payment received is applied to that account 675, and the remainder 676, if any, is then applied to the next priority service establishment (SE) account, seriatim 677, until the remainder is zero 676. The results of this processing (a set of prioritized account payments) is then sent as a payment instruction 678 to the financial institution (FIN) on file in the household (HH) record. If there is no priority established, the personal settlements exchange (PSX) invokes a set of default priorities 674, which may be based on any number of criteria, including, for example, general consumer preference, legal exposure, and interest cost minimization. The partial payments routine then returns file management to the exception management system.

The rescheduled payment processing mechanism of the present invention is discussed in FIG. 4C.2–2, which is an extension of the exception response table action alternatives 655 of FIG. 4C.2. FIG. 4C.2–2 shows a further detail of FIG. 4C.2, and is a flow diagram of the processing of rescheduled payments. Under this processing regime, payments are delayed, deferred or extended over time to better match the payment ability of the household (HH) in those cases in which such accommodation might be necessary.

Payment rescheduling is among the more complex management actions in response to failed payments. There is a premium placed on collecting current information and on forming a complete picture of the household's (HH) overall obligations, then determining the time period over which a rescheduling plan should be implemented in an effort to return the household (HH) to current standing and thereby reduce the system default risk to within tolerable limits. Depending on the particular embodiment of the present invention, there may also be a need to communicate in advance with the service establishments (SE) whose obligations are being rescheduled.

In the preferred embodiment, the communication is shown as handled after the rescheduling routine has returned the file to the exception management procedures table. The household (HH) record is retrieved 680 and updated 681 by accessing on-line financial records and credit profiles, and based on this information a disposable income and cash availability base is determined. The monthly outflow already known from the consolidated proforma payments information in the personal settlements exchange (PSX) is then compared 683 with the monthly disposable cash to determine whether there is a deficiency in the ability to meet monthly obligations on a continuous basis. In that event, the household (HH) is contacted 684 by customer service representatives about the options and alternatives for restructuring or refinancing the household (HH) obligations. If, in the alternative, there is no permanent deficit, but rather a short term overdue situation, then the system evaluates 685 the actual number of periods past due 686 and on which service establishment (SE) accounts.

If the past due amount does not exceed one payment period, the current proforma amount can be extended or spread over the current and next periods, or deferred for later payment in full with the next period's payment due. Alternatively, in the event there is more than one past due period, the past due amount may be spread over several future periods, deferred until payments are current, or some combination of these and other options. It may also be the case that only a subset of payments is past due, while others are current. In order to resolve the household (HH) situation rationally and relatively comprehensively, the system will select a consolidated payment rescheduling profile that best achieves the objectives based on criterion established in the procedures table 654 in FIG. 4C.2, such as, for example, minimizing system risk, maximizing feasible payments to the system, or minimizing the implicit or explicit interest expense to the household (HH) of the rescheduling program. Once this is established, the duration of the program can be set and then checked 694, the payment risk factor and proforma payment amounts recomputed 695, and payment instructions sent 696 to the appropriate financial institutions (FIN). The system finally returns 697 to the procedures table of the exception management system for final communications and processing.

FIG. 3 shows the customer service and communications apparatus that facilitates the execution of the above processes for handling partial and rescheduled payments. Households (HH), service establishments (SE), and financial institutions (FIN) may communicate by telephone, by electronic means, including computer and by modem telephone connection with customer service representatives and management personnel at the personal settlements exchange (PSX). This is facilitated by an advanced private branch exchange (PBX) and modem bank 314 (FIG. 3), as well as audio response units (ARU) 315 connected to the communications system for automated call handling. The communications controller 316 manages the overall communications process, including access to the central processing unit (CPU), as well as direct linkages to customer service representatives. Customer service itself operates a series of workstations 312, each of which is connected through a workstation controller 313 to the central processing unit (CPU) for access to files and on-line processing of data, information requests, and specific transactions.

As previously discussed, in the preferred embodiment, the personal settlements exchange (PSX) might actually take over the management of the billing and collection process for each subscribing service establishment (SE). Consequently, the personal settlements exchange (PSX) would have an obligation to maintain a flow of payments to each service establishment (SE), irrespective of the difficulties it may encounter in collection, rescheduling, or receipt of partial payments. While the payment risk analysis is designed to anticipate and minimize these occurrences, the personal settlements exchange (PSX) also contains a payment reserve and credit enhancement feature which backstops the liquidity of the system, and ensures that payments are made on a timely manner and in full amount to each service establishment (SE).

The cash reserves are monitored and adjusted continually against the overall payment obligations in the system. The funding for these reserve accounts comes from a small deduction made from household (HH) payments, from a portion of the personal settlements exchange (PSX) revenue paid to the personal settlements exchange (PSX) for services performed, or from credit lines. The reserve accounts may contain cash or provide access to cash through credit lines, and through securities such as, for example, credit derivatives and securitized assets. Should additional cash be required to meet payment obligations to service establishments (SE), it would be sourced from those supporting the personal settlements exchange (PSX) reserve accounts maintained for that purpose.

The reserve monitoring and payment adjustment process is outlined in FIG. 4D, which shows further detail of the liquidity support and credit enhancement features of the invention. Confirmed actual payments received 701 from households (HH) are applied to their service establishment (SE) obligations, and the payment application file of each household (HH) is updated in each service establishment (SE) 702 accordingly. The difference if any between payments thus applied and the actual amount and due date are calculated 703 and the running variance is continuously monitored in the reserve and liquidity support 707 function supporting the personal settlements exchange (PSX). The status of the variance 703 is also tracked internally in the personal settlements exchange (PSX) so the system can adjust 704 the deductions made for retention in the reserve accounts of the personal settlements exchange (PSX). For example, if the difference between actual and proforma payments grows into a deficit, the reserve deduction deposited to back-up accounts would automatically increase in anticipation of potential shortfalls in available cash to pay service establishment (SE). In the case of a growing surplus (proforma payments exceed actual obligations based on consumption), the retention could reasonably be reduced in view of the reduced need to rely on reserves for payment. The system is also designed to evaluate 705 the difference between expected aggregate payments to service establishment (SE) and the expected available funds from payments received and from existing reserves and credit sources. At the appointed payout time to service establishment (SE), all available funds are paid to service establishment's (SE) and a determination is made to draw 706 from reserve accounts to make up any shortfall to the required aggregate payment value. If additional funds are needed, they are drawn from the financial institution (FIN) sector 708 and changes in the balances and reserves of the personal settlements exchange (PSX) are adjusted and update as needed 709.

FIG. 4D.1 shows further detail of FIG. 4D and is a flow diagram of the liquidity support and credit enhancement features of the present invention. Typically, the amount of the reserve cash balance would be determined by analyzing 751 the historical arrears and write-off history of the pool of service establishments (SE) in the personal settlements exchange (PSX). These historical patterns would then be applied to future periods and values to develop a projection 752 of the potential losses and costs of delayed payments. Based on this projected loss potential, a "first-loss" provision is established for funding 753 these potential shortfalls. Additional facilities, such as insurance and credit can then be employed to provide further protection 754 to the system up to a targeted level.

The final phase of the payment cycle involves crediting to household (HH) account numbers in each service establishment (SE), the payments received. This is seen in FIG. 4E. Financial institutions (FIN) are instructed to credit the household (HH) payments previously debited from household (HH) accounts to service establishment (SE) accounts, with a small portion of the payment flow also being held to fund 801 reserve accounts described above. Financial institutions (FIN) upload and store 802 this aggregate payment information, transfer 803 funds collected from household (HH) accounts to service establishment (SE) accounts, and download 804 confirmation of the debits and credits to the personal settlements exchange (PSX) 805 and to service establishments (SE) 806.

The personal settlements exchange (PSX) at this stage downloads 807 the service detail and payments made for the prior period, as well as service consumption for the current period, along with current billing information, either actual or proforma. Financial institutions (FIN) receive this information and use it to compile 809 consolidated statements to be sent to households (HH) along with the standard credit card, debit card, or checking account details ordinarily issued to household (HH) account holders. In the preferred embodiment, there is no need for service establishments (SE) to issue statements separately, since all the normal service establishment (SE) statement information has already been communicated to households (HH) through their financial institution (FIN) statement mailings.

The personal settlements exchange (PSX) downloads 810 complete data files to all service establishments (SE) detailing the allocation of the aggregate payment to individual household (HH) service establishment (SE) accounts. This completes the payment process and results in settlement of the original obligation. In the instance in which the personal settlements exchange (PSX) manages all receivables and collection, there is simply a steady stream of cash flowing to the service establishment (SE) on a periodic basis, and the actual status of household (HH) accounts is only meaningful to the service establishment (SE) as an administrative and customer service matter. As long as the personal settlements exchange (PSX) is comfortable with payment performance, the service establishment (SE)'s role is to ensure continued supply of goods and services. The system databases are updated 812 and the payment cycle is indexed 813 to the next period (T=t+1).

It is understood that the preferred embodiment is only one illustrative version of the present invention, and that any number of variations and constructions toward the same ends could be envisioned using the methods and apparatus described; these are equally encompassed in this patent description.

What is claimed is:

1. A method of payment of bills of establishments by purchasers, comprising:

providing a settlements exchange with billing information from establishments;

calculating an obligation value for each purchaser;

downloading the obligation value for each purchaser from the settlements exchange to a financial institution having an account for the purchaser;

based on guidelines automatically instructing the financial institution to apply to the purchaser's account, at least a portion of the obligation value;

aggregating all of the obligation values that have been applied to purchaser's accounts that are destined for the same establishments; and instructing the financial institutions to issue these credits to the establishment.

2. The method of paying bills of claim 1, wherein the step of calculating an obligation value calculates a consolidated actual payment value.

3. The method of paying bills of claim 1, wherein the step of calculating an obligation value calculates a constant proforma consolidated payment value.

4. The method of paying bills of claim 1, further including generating a single consolidated billing statement for the purchaser and transmitting the single consolidated billing statement to each purchaser.

5. The method of paying bills of claim 4, wherein the step of generating a consolidated billing statement generates an electronic consolidated billing statement.

6. The method of paying bills of claim 4, wherein the step of generating a consolidated billing statement generates a printed consolidated billing statement.

7. The method of paying bills of claim 4, wherein the step of transmitting a consolidated billing statement is by mail.

8. The method of paying bills of claim 4, wherein the step of transmitting a consolidated billing statement is electronic.

9. The method of paying bills of claim 1, further including the step of issuing to each establishment a detailed verification of each purchaser's payment.

10. A method of payment of bills of establishments by purchasers, comprising:

providing a settlements exchange with billing information from service establishments;

calculating an obligation value for each purchaser;

downloading the obligation value and the billing information for each purchaser from the settlements exchange to a financial institution;

based on guidelines automatically instructing the financial institution to debit from or charge to an account for the purchaser, at least a portion of the obligation value;

enabling financial institutions to make payments to each establishment on behalf of all purchasers served; and identifying to establishments the correct application to accounts of the payments received.

11. The method of paying bills of claim 2, wherein the step of calculating an obligation value calculates a consolidated actual payment value.

12. The method of paying bills of claim 2, wherein the step of calculating an obligation value calculates a proforma payment value.

13. The method paying bills of claim 12, wherein the step of calculating a proforma payment value further comprises:

compiling risk factors; and computing risk-adjusted establishment-specific payments for each purchaser.

14. The method of paying bills of claim 10, further including the steps of generating a single consolidated billing statement and transmitting the single consolidated billing statement to each purchaser.

15. The method of paying bills of claim 14, wherein the step of generating a billing statement generates an electronic consolidated billing statement.

16. The method of paying bills of claim 14, wherein the step of generating a billing statement generates a printed consolidated billing statement.

17. The method of paying bills of claim 14, wherein the step of transmitting a consolidated billing statement is by mail.

18. The method of paying bills of claim 14, wherein the step of transmitting a consolidated billing statement is electronic.

19. The method of paying bills of claim 10, further including the step of issuing to each establishment a detailed verification of each purchaser's payment.

20. The method of paying bills of claim 10, wherein the step of providing a settlements exchange with billing information from establishments, further comprises:

enrolling purchasers in the settlements exchange;

downloading historical purchaser information to the settlements exchange;

creating a matched database of purchasers, establishments and financial institutions;

assigning a unique identifier to each purchaser; and downloading establishment billing information on a continuing basis.

21. The method of paying bills of claim 10, further including the step of calculating of payment risk factors for the purchaser.

22. The method of paying bills of claim 21, wherein the step of calculating payment risk factors for the purchaser further comprises:

analyzing historical payment patterns for establishments and financial institutions;

computing a payment risk factor for purchasers;

computing a receivables risk factor for establishments; and normalizing the purchaser and establishment risk factors.

23. The method of paying bills of claim 10, wherein the step of calculating an obligation value for each purchaser, further comprises:

compiling risk-adjustment factors with which to adjust the obligation value for each purchaser to each service establishment;

consolidating all purchaser establishment payment obligations into a single value; and further calculating a constant consolidated obligation value.

24. The method of paying bills of claim 10, wherein the step of downloading from a settlements exchange to a financial institution, further comprises:

establishing a connection between the settlements exchange and the financial institution;

creating billing information;

correlating purchasers with financial institutions; and downloading billing information detail to financial institutions.

25. The method of paying bills of claim 10, wherein the step of instructing financial institutions to debit from or charge to the purchaser, an obligation value, further comprises:

issuing instructions to financial institutions;

channeling failed payments or specially designated accounts to an exception handling system; and confirming payments by financial institution, purchaser, and amount of debit or charge.

26. The method of paying bills of claim 10, wherein the step of enabling payments to establishments, further comprises:

accumulating the obligation values destined for the same establishments;

downloading to financial institutions information for establishments; and instructing financial institutions to issue the obligation values to establishments.

27. The method of paying bills of claim 10, wherein the step of identifying to establishments the correct application to individual purchaser accounts of the aggregate payments received further comprises:

receiving from financial institutions correspondence between aggregate payments made and the payment instructions;

generating a list of individual purchasers and their corresponding payments by establishment;

sorting the payments by establishment;

sorting the establishment specific purchaser payments; and downloading to establishments, the list of applied account payments.

28. A method of providing a settlements exchange with billing information from establishments, comprising:

enrolling purchasers in the settlements exchange;

downloading historical information to the settlements exchange;

creating a matched database of purchasers, establishments and financial institutions;

assigning a unique identifier to each purchaser;

downloading establishment billing information; and processing establishment billing information on a continuing basis.

29. A method of calculation of payment risk factors comprising:

analyzing historical payment patterns for establishments and financial institutions;

computing a payment risk factor for purchasers;

computing a receivables risk factor for establishments; and normalizing the payment and receivables risk factors.

30. A method of calculating of proforma payments for purchaser services, comprising:

compiling risk factors for purchasers; and computing risk-adjusted establishment-specific payments for each purchaser.

31. A method of calculating an obligation value for purchasers, comprising:

compiling risk-adjustment factors with which to adjust the obligation value for each purchaser to each establishment;

consolidating all purchaser establishment payment obligations into a single value; and further calculating a constant consolidated obligation value.

32. A method of instructing financial institutions to debit from or charge to a purchaser, an obligation value, comprising:

based on guidelines, automatically instructing a financial institution to apply at least a portion of the obligation value;

channeling failed payments or specially designated accounts to an exception handling system; and confirming payments by financial institution, purchaser, and amount of debit or charge.

33. A method of making payments to establishments, comprising:

accumulating purchaser obligation values destined for the same establishments;

downloading to financial institutions information for establishments; and based on guidelines, automatically instructing financial institutions to issue at least a portion of the purchaser obligation values to establishments.

* * * * *